(12) United States Patent
Huelsebusch et al.

(10) Patent No.: US 9,021,741 B2
(45) Date of Patent: May 5, 2015

(54) PATH-CONTROLLED ADJUSTMENT DEVICE WITH A MULTIPART CARRIER ASSEMBLY

(71) Applicant: Brose Fahrzeugteile GmbH & Co. Kommanditgesellschaft, Hallstadt, Hallstadt (DE)

(72) Inventors: Thomas Huelsebusch, Pettstadt (DE); Silvia Enders, Grossenseebach (DE); Pierre-Dominique Bernard, Untermerzbach (DE)

(73) Assignee: Brose Fahrzeugteile GmbH & Co. Kommanditgesellschaft, Hallstadt, Hallstadt (DE)

( * ) Notice: Subject to any disclaimer, the term of this patent is extended or adjusted under 35 U.S.C. 154(b) by 0 days.

(21) Appl. No.: 14/355,574

(22) PCT Filed: Nov. 2, 2012

(86) PCT No.: PCT/EP2012/004563
§ 371 (c)(1),
(2) Date: Apr. 30, 2014

(87) PCT Pub. No.: WO2013/064256
PCT Pub. Date: May 10, 2013

(65) Prior Publication Data
US 2014/0250790 A1    Sep. 11, 2014

(30) Foreign Application Priority Data

Nov. 4, 2011    (DE) .......................... 10 2011 085 742

(51) Int. Cl.
*E05F 15/08*    (2006.01)
*B60J 1/17*    (2006.01)
(Continued)

(52) U.S. Cl.
CPC  *B60J 1/17* (2013.01); *B60J 5/0416* (2013.01); *E05F 15/1669* (2013.01)

(58) Field of Classification Search
CPC ........ B60J 1/17; B60J 5/0416; E05F 15/1669
USPC .................... 49/348, 349, 352, 502
See application file for complete search history.

(56) References Cited

U.S. PATENT DOCUMENTS 6,526,696 B2 *  3/2003  Cardine .......................... 49/227
6,874,279 B1 *  4/2005  Weber et al. .................... 49/352
(Continued)

FOREIGN PATENT DOCUMENTS

DE         199 44 965 A1   3/2001
DE    10 2005 033 116 A1   1/2007
(Continued)

OTHER PUBLICATIONS

International Search Report for PCT/EP2012/004563, mailed on Mar. 6, 2013, 3 pages.
(Continued)

*Primary Examiner* — Jerry Redman
(74) *Attorney, Agent, or Firm* — Christie, Parker & Hale, LLP

(57) ABSTRACT

The invention relates to a path-controlled adjustment device for a window pane of a motor vehicle, with a carrier assembly, with at least two guideways provided at the carrier assembly, which define an adjustment path for an adjustable window pane and which are spaced from each other transversely to the adjustment path, and with a driver which on the one hand includes means for connection of the window pane to be adjusted and which on the other hand is in engagement with the guideways so as to be longitudinally movable. The carrier assembly consists of at least two carrier elements which are connected with each other at a plurality of fixing points. On at least one carrier element fixing points, via which that carrier element is to be fixed at a further carrier element of the carrier assembly, are connected with each other by reinforcement paths.

15 Claims, 22 Drawing Sheets

(51) Int. Cl.
  *B60J 5/04*   (2006.01)
  *E05F 15/16*  (2006.01)

(56) References Cited

U.S. PATENT DOCUMENTS

| | | | |
|---|---|---|---|
| 8,109,039 B2* | 2/2012 | Kruger et al. | 49/349 |
| 8,839,566 B2* | 9/2014 | Deschner | 49/502 |
| 2002/0046498 A1* | 4/2002 | Cardine | 49/352 |
| 2004/0237410 A1* | 12/2004 | Cardine et al. | 49/352 |
| 2007/0251149 A1* | 11/2007 | Kirejczyk et al. | 49/352 |
| 2011/0078957 A1* | 4/2011 | Deschner | 49/352 |
| 2011/0225888 A1* | 9/2011 | Aschmutat et al. | 49/352 |
| 2013/0160371 A1* | 6/2013 | Hayotte | 49/352 |

FOREIGN PATENT DOCUMENTS

| | | |
|---|---|---|
| DE | 10 2006 017 424 A1 | 10/2007 |
| DE | 10 2008 032 963 A1 | 1/2010 |
| GB | 2 262 957 A | 7/1993 |
| JP | 2010-000977 A | 1/2010 |

OTHER PUBLICATIONS

English translation of Written Opinion of the International Searching Authority for International Application No. PCT/EP2012/004563, dated Jun. 3, 2013, 6 pages.

\* cited by examiner

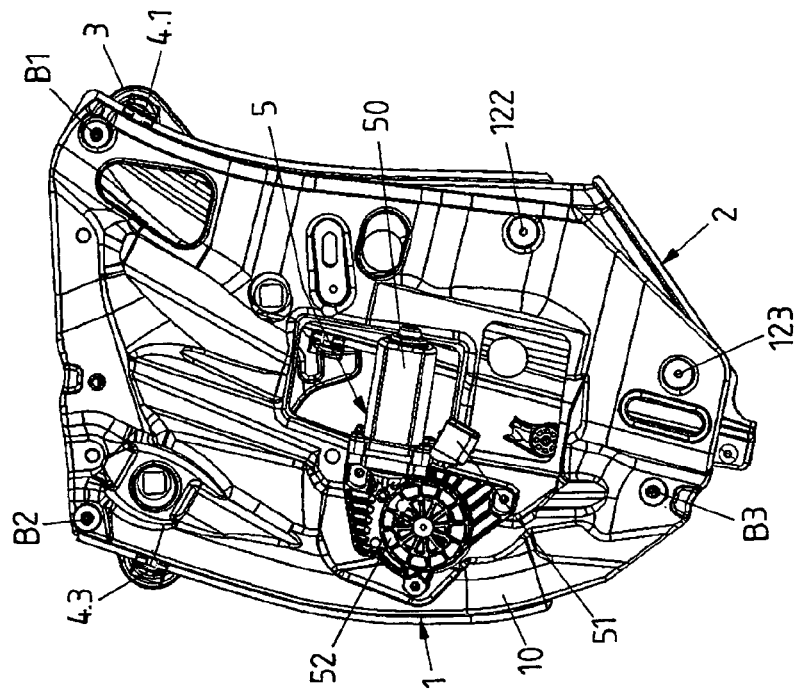
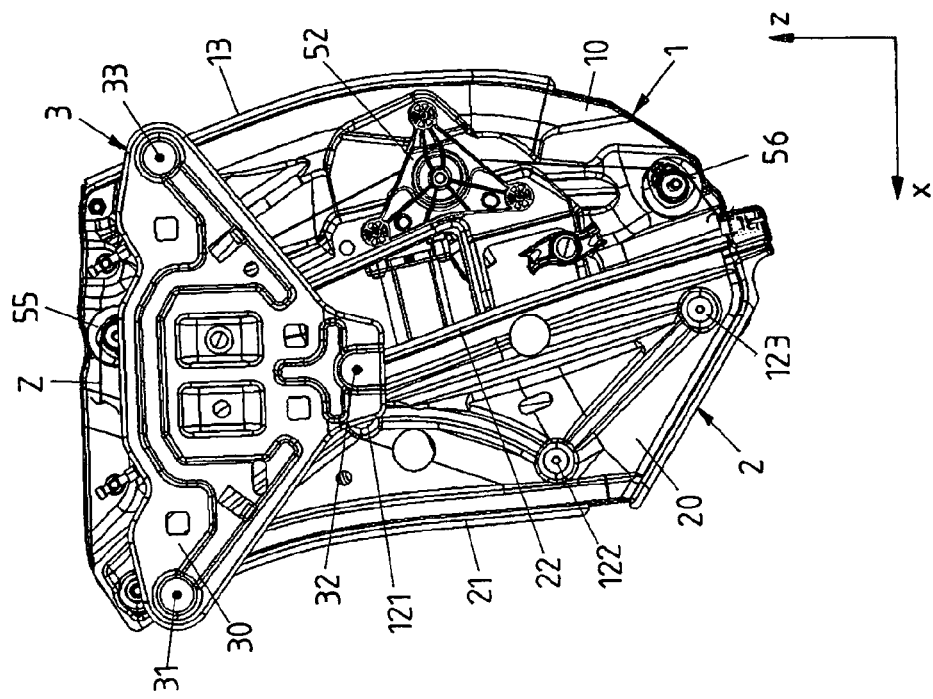

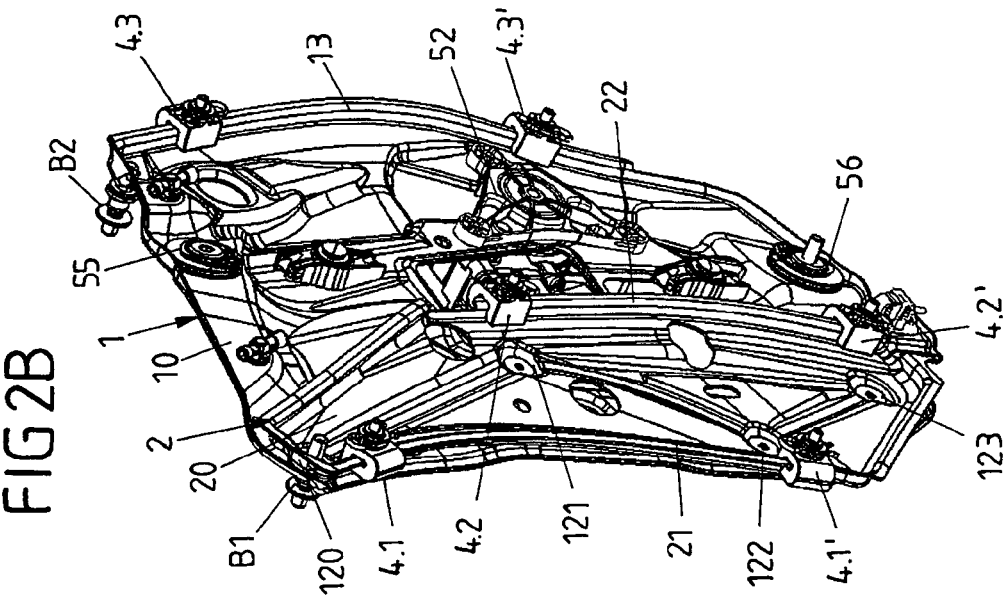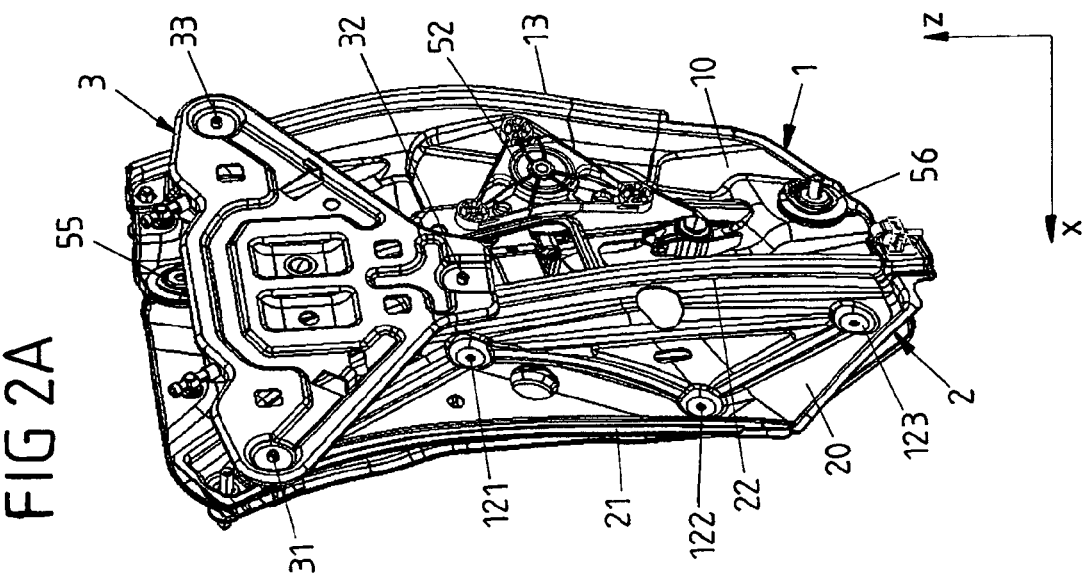

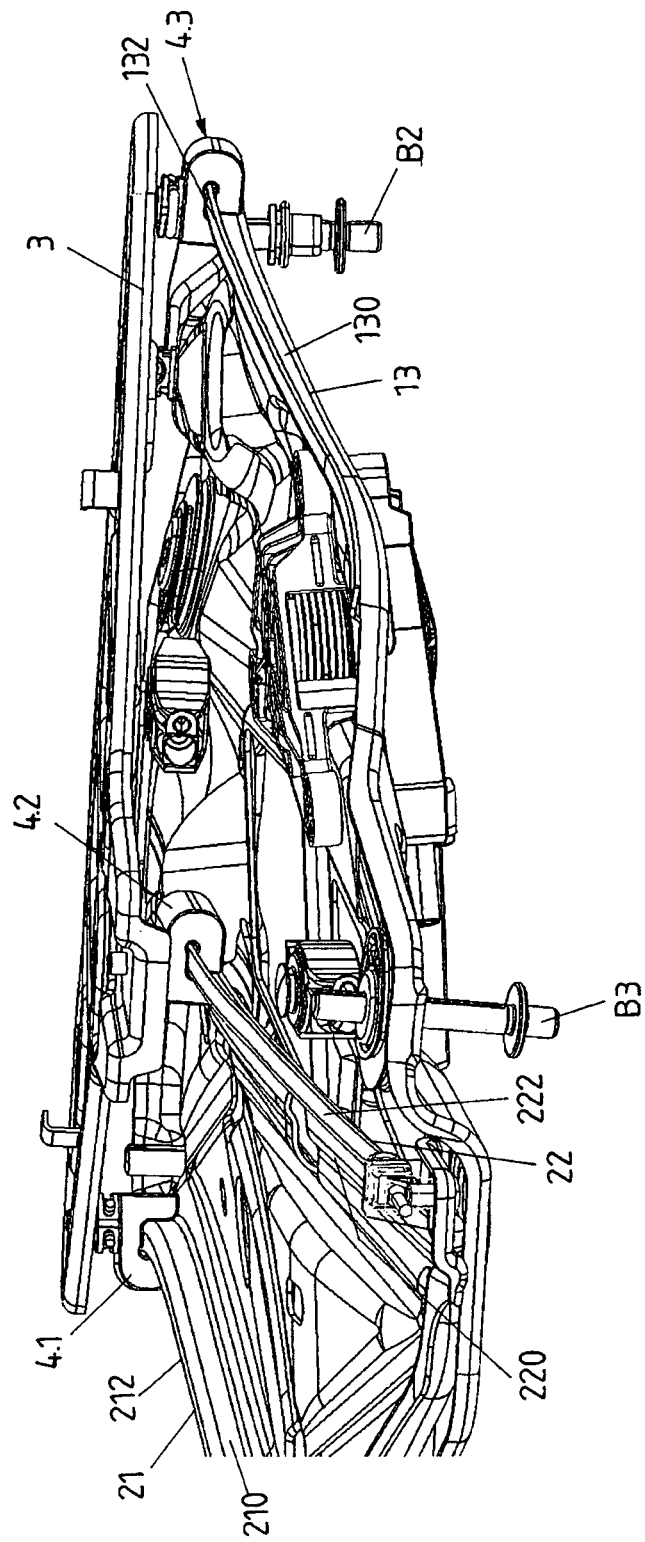

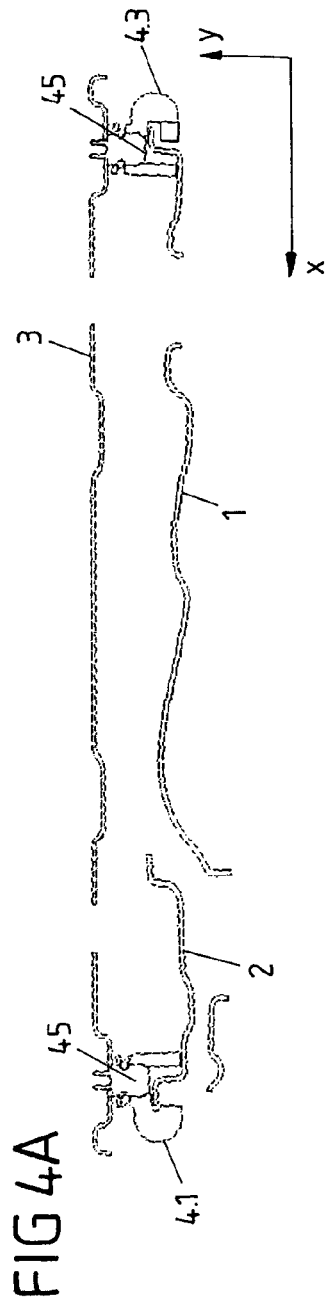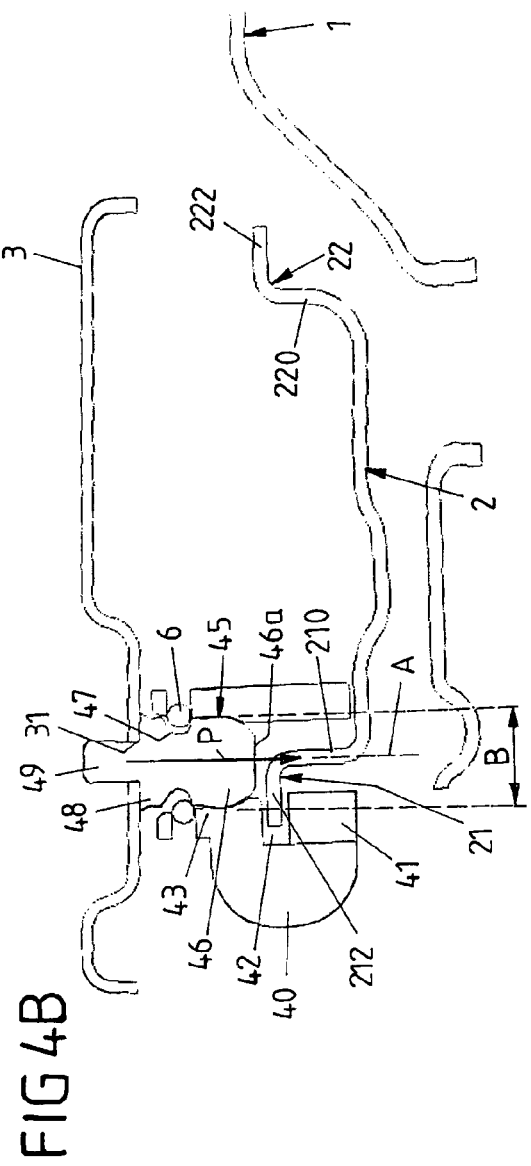
FIG 4A
FIG 4B

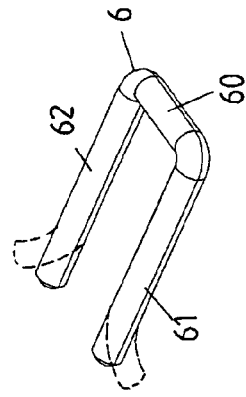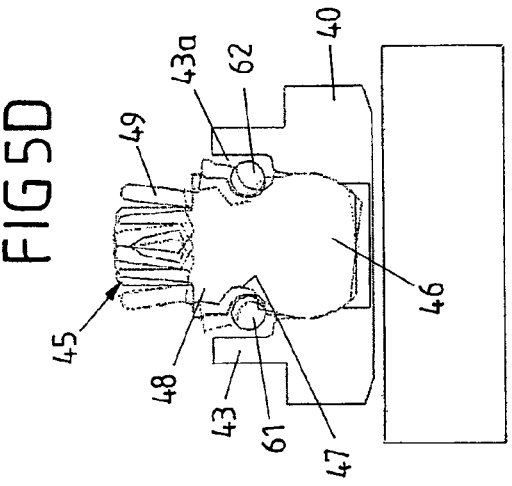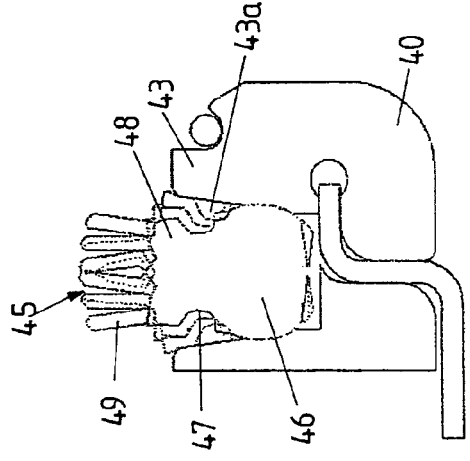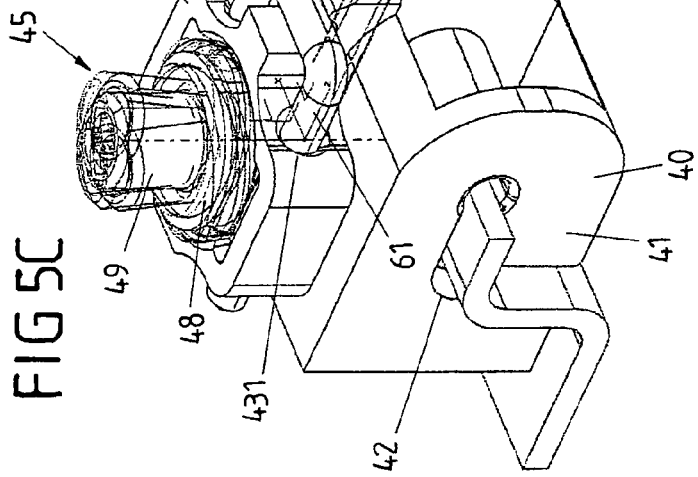

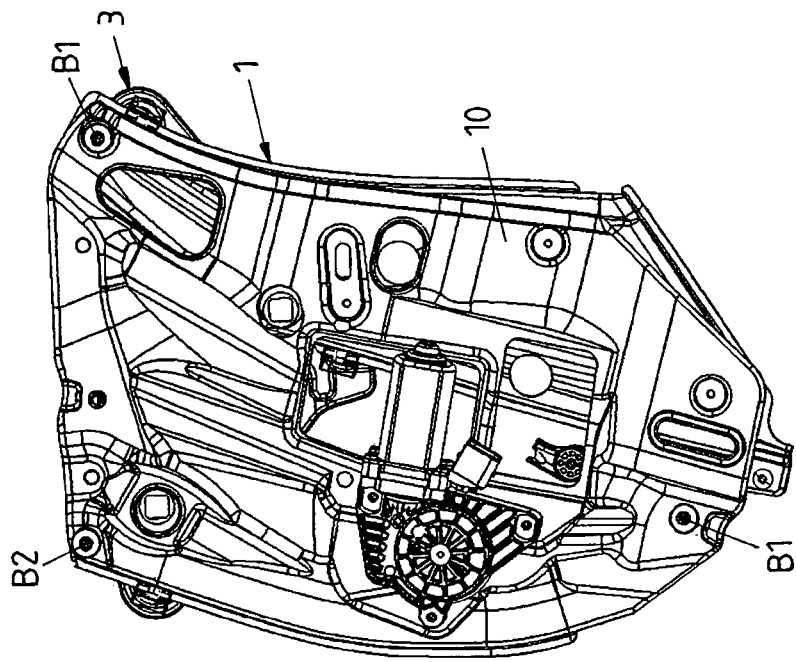
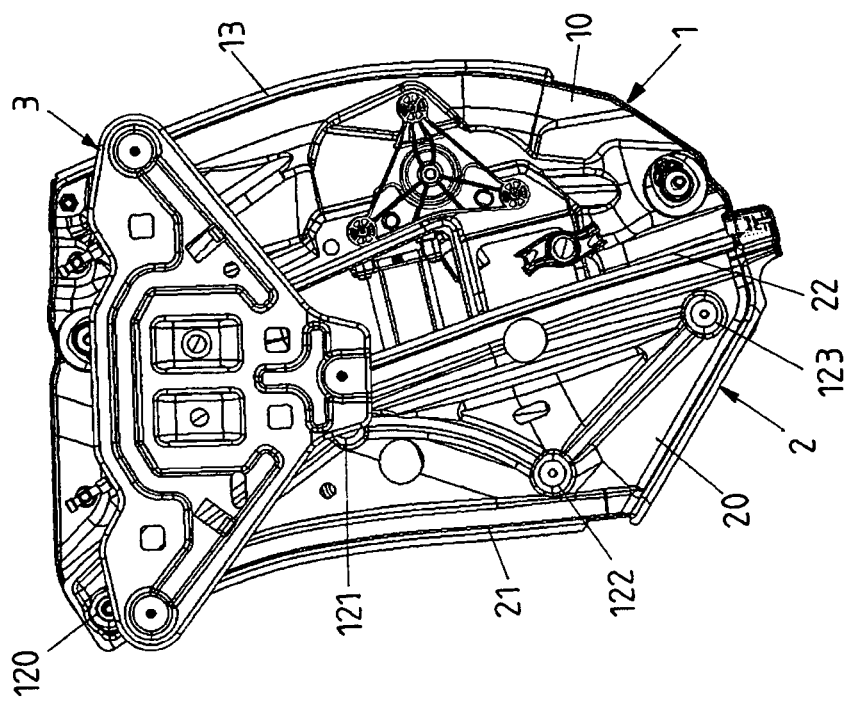

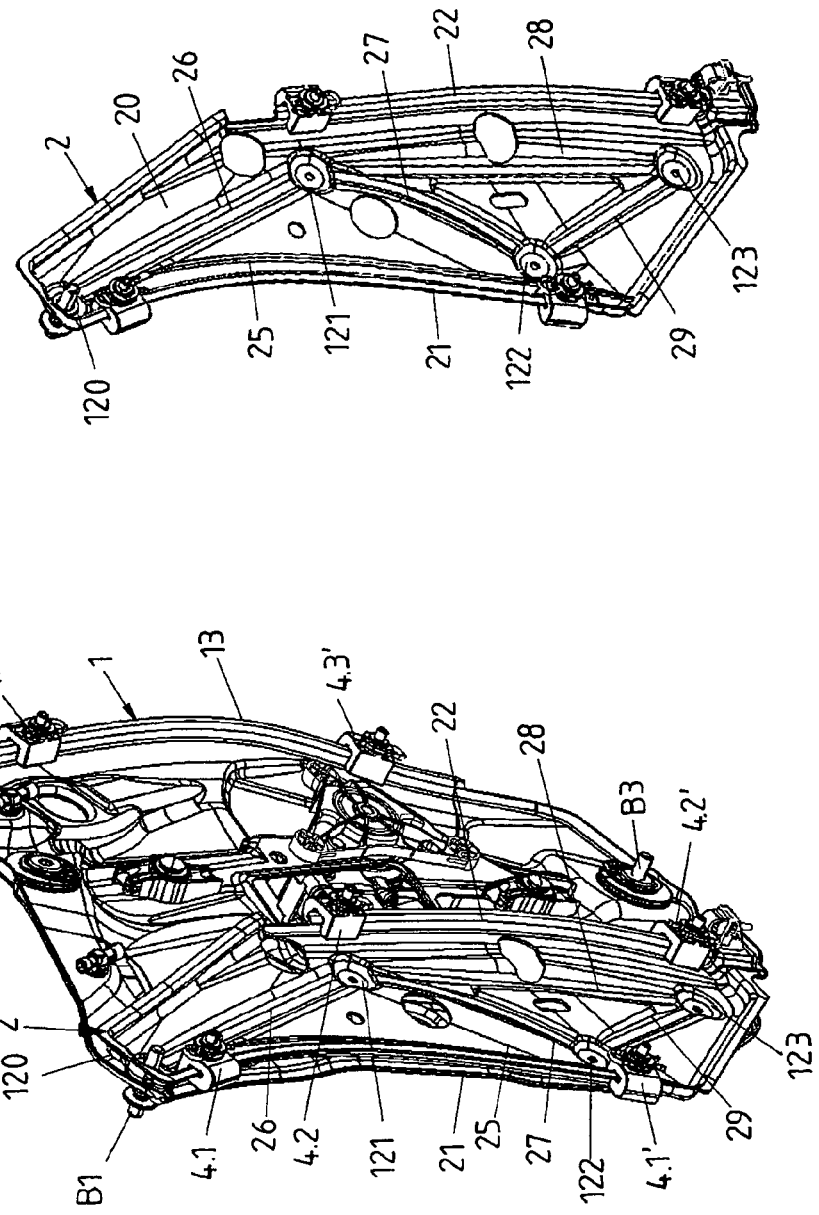

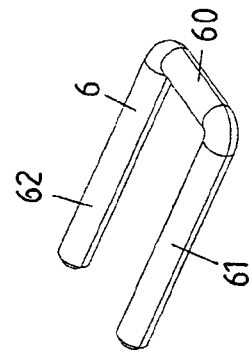
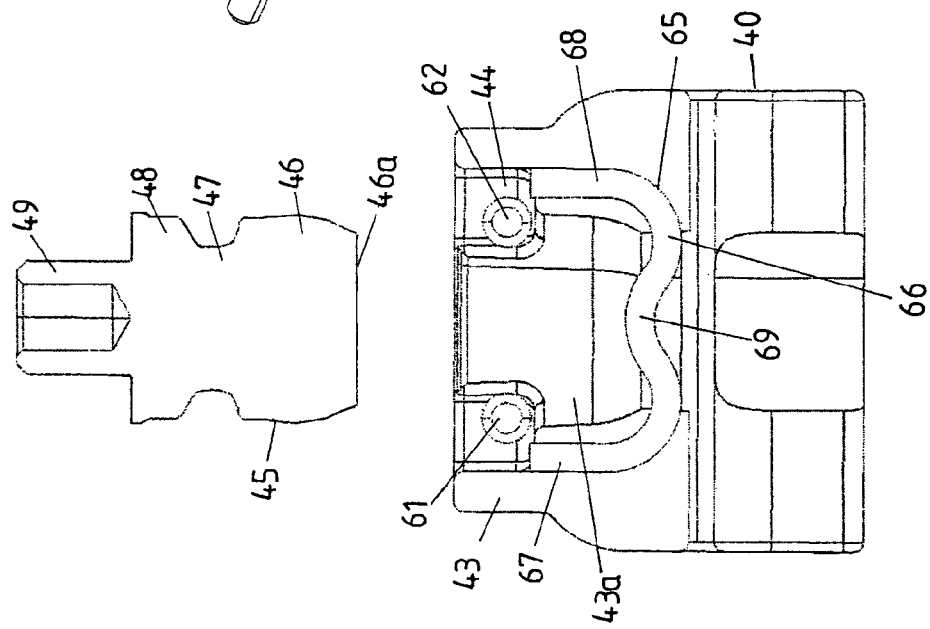
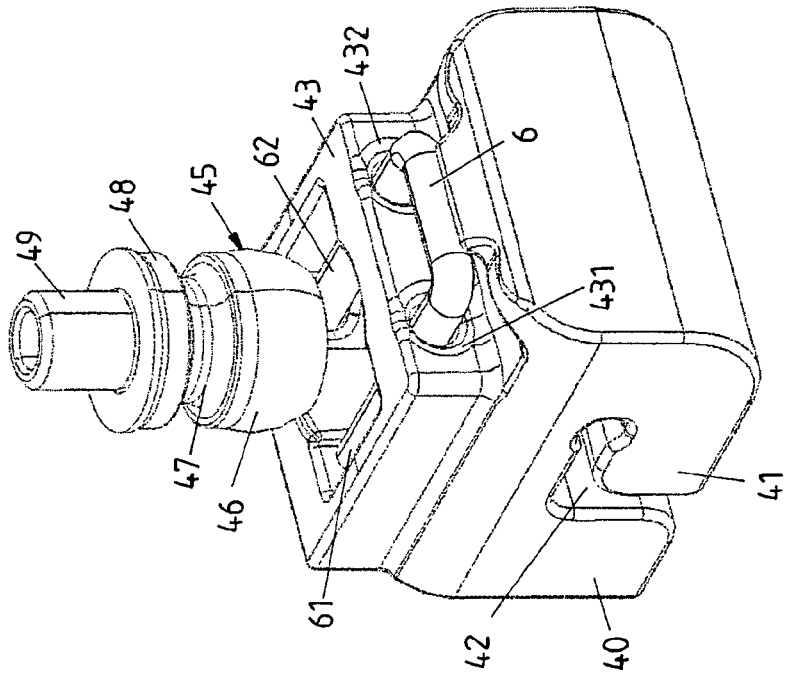

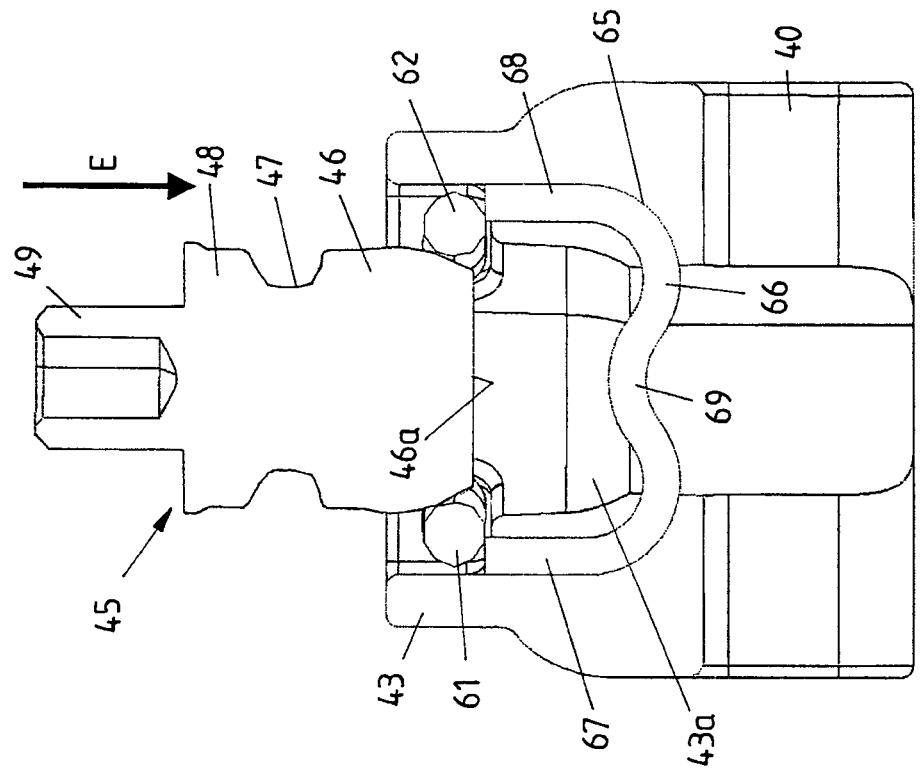
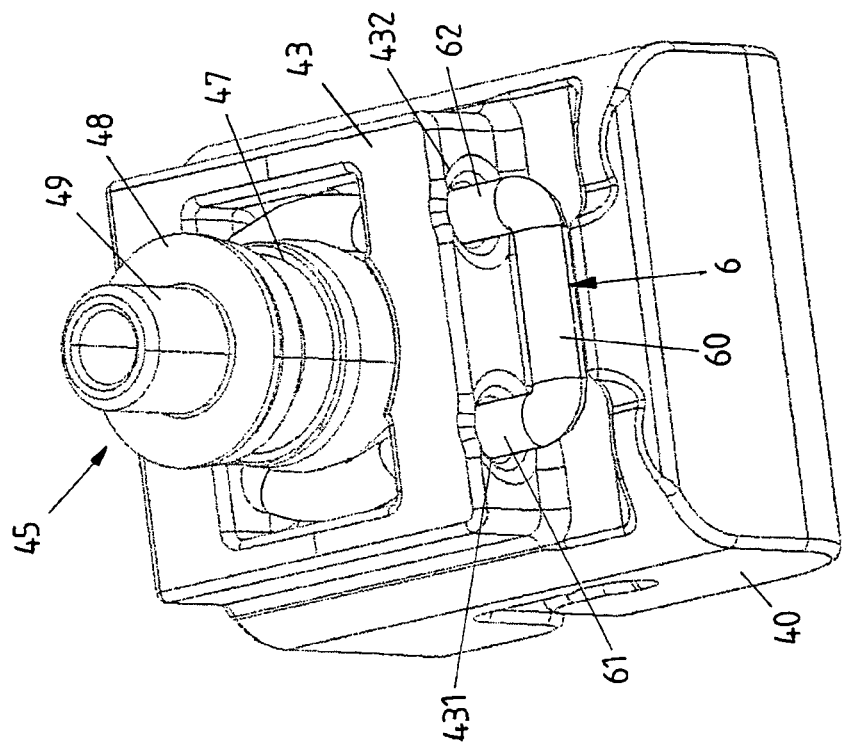

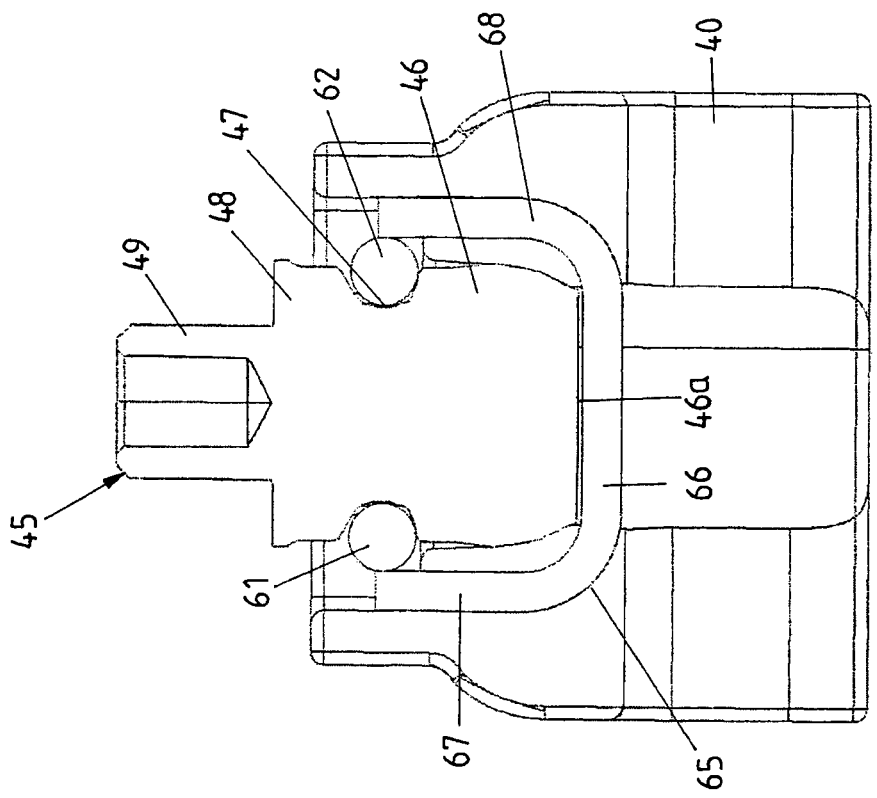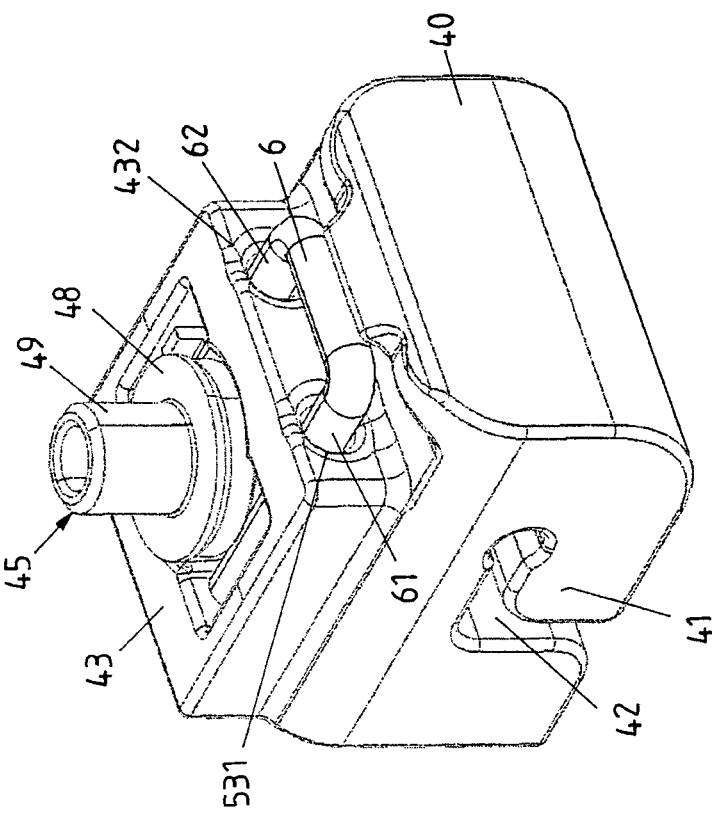

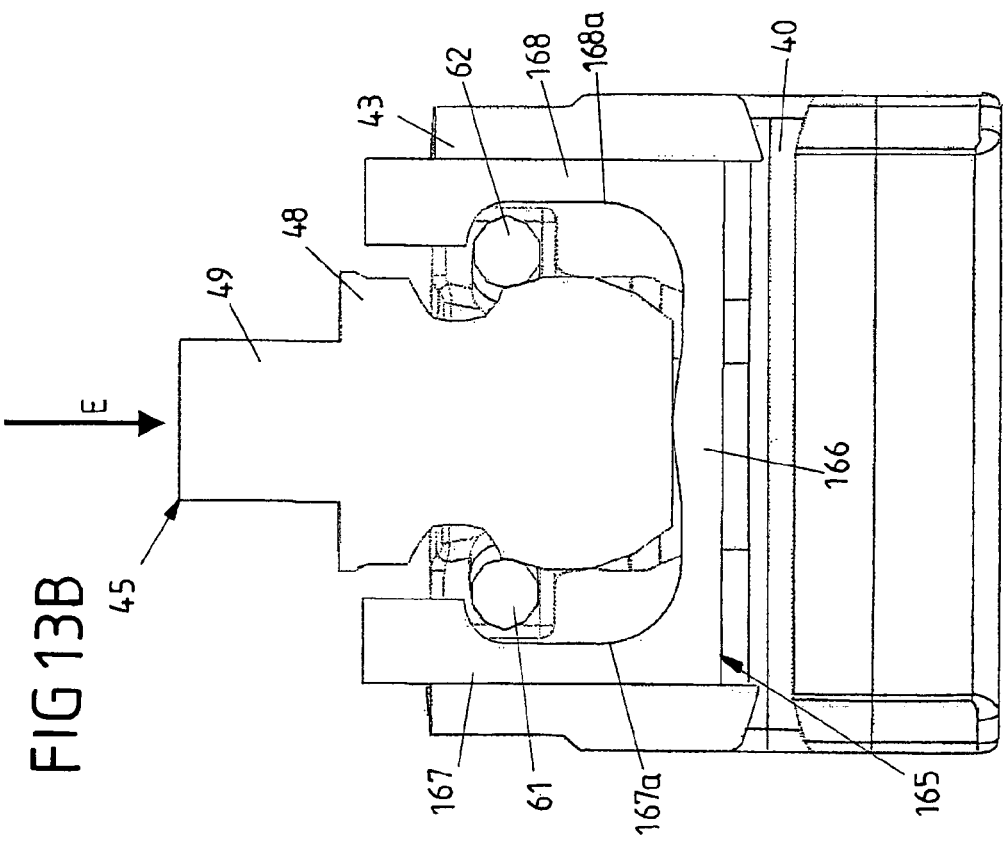
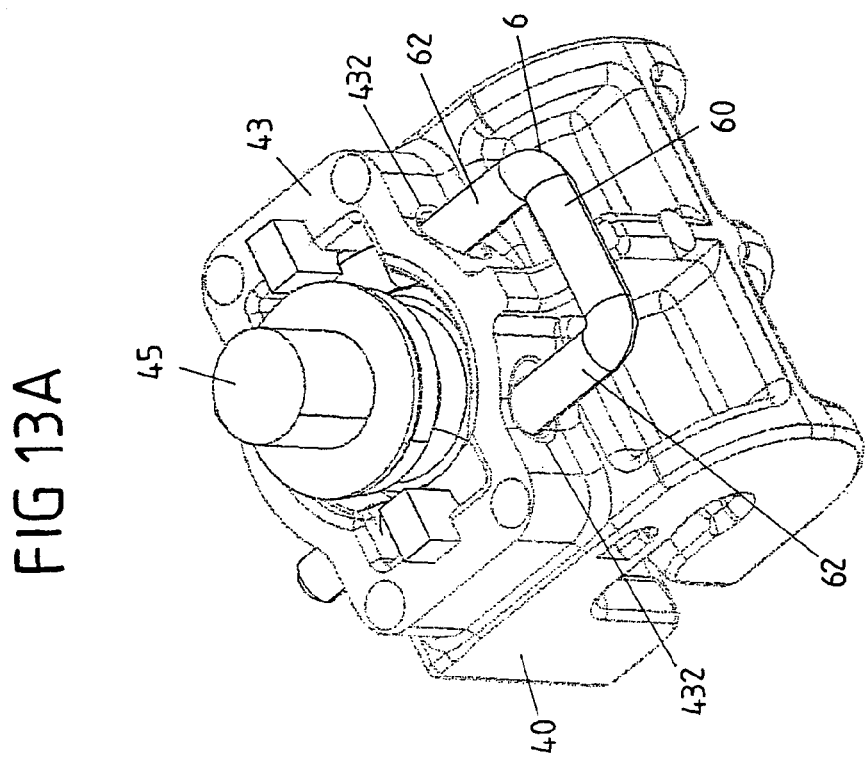

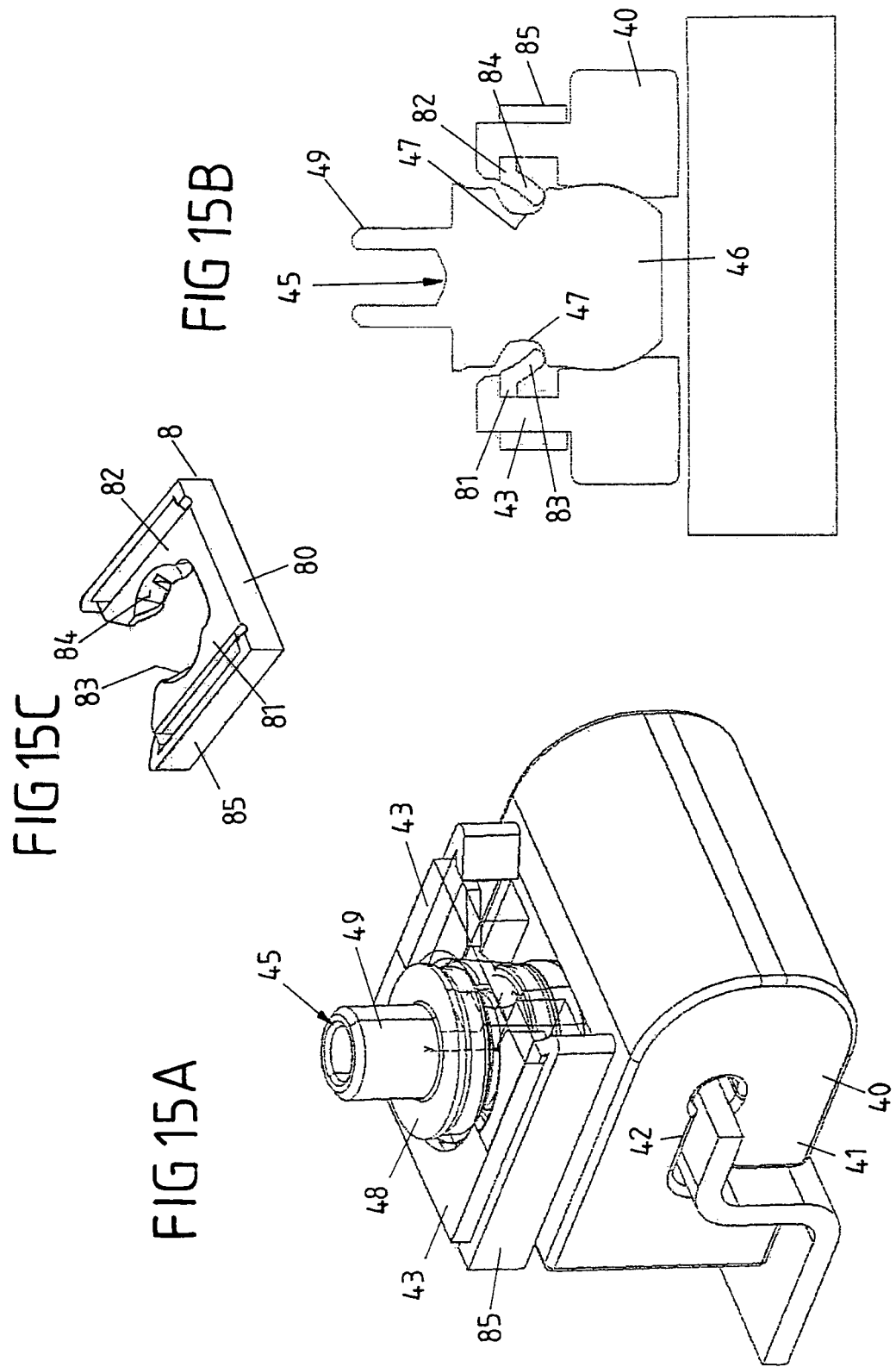

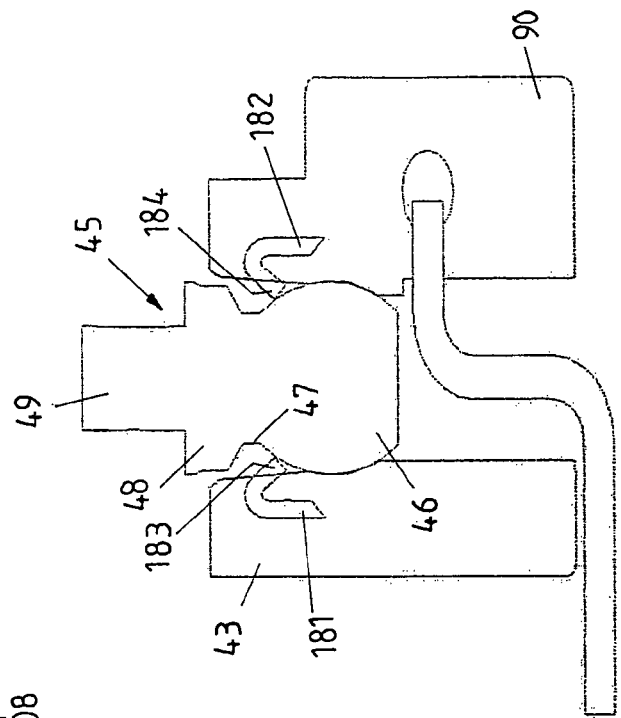
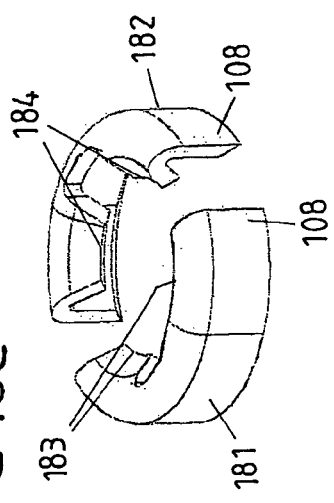
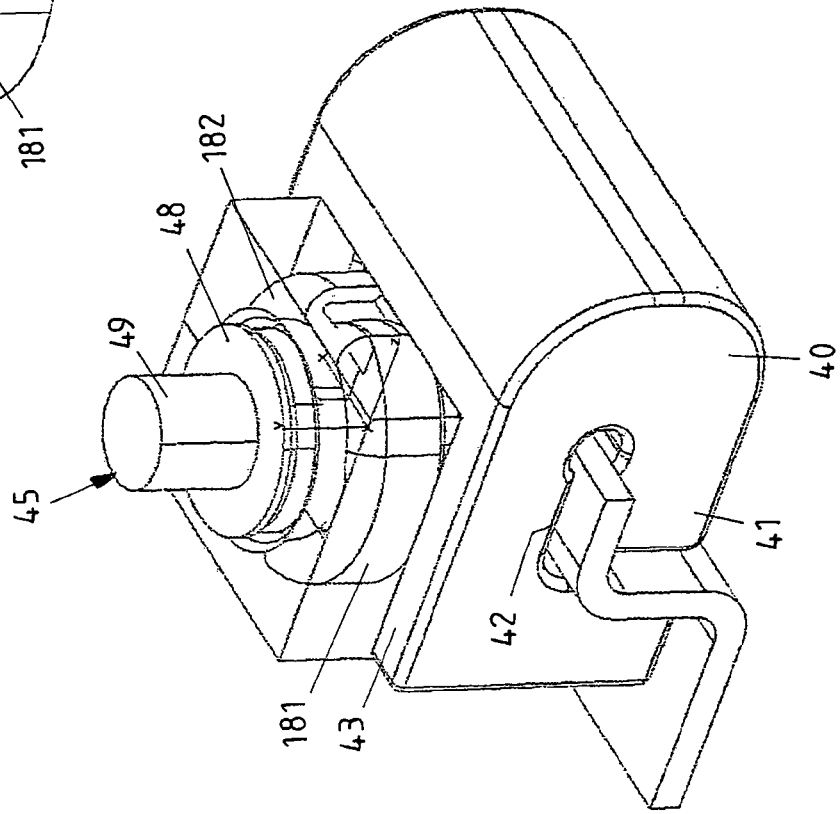
FIG 16B
FIG 16C
FIG 16A

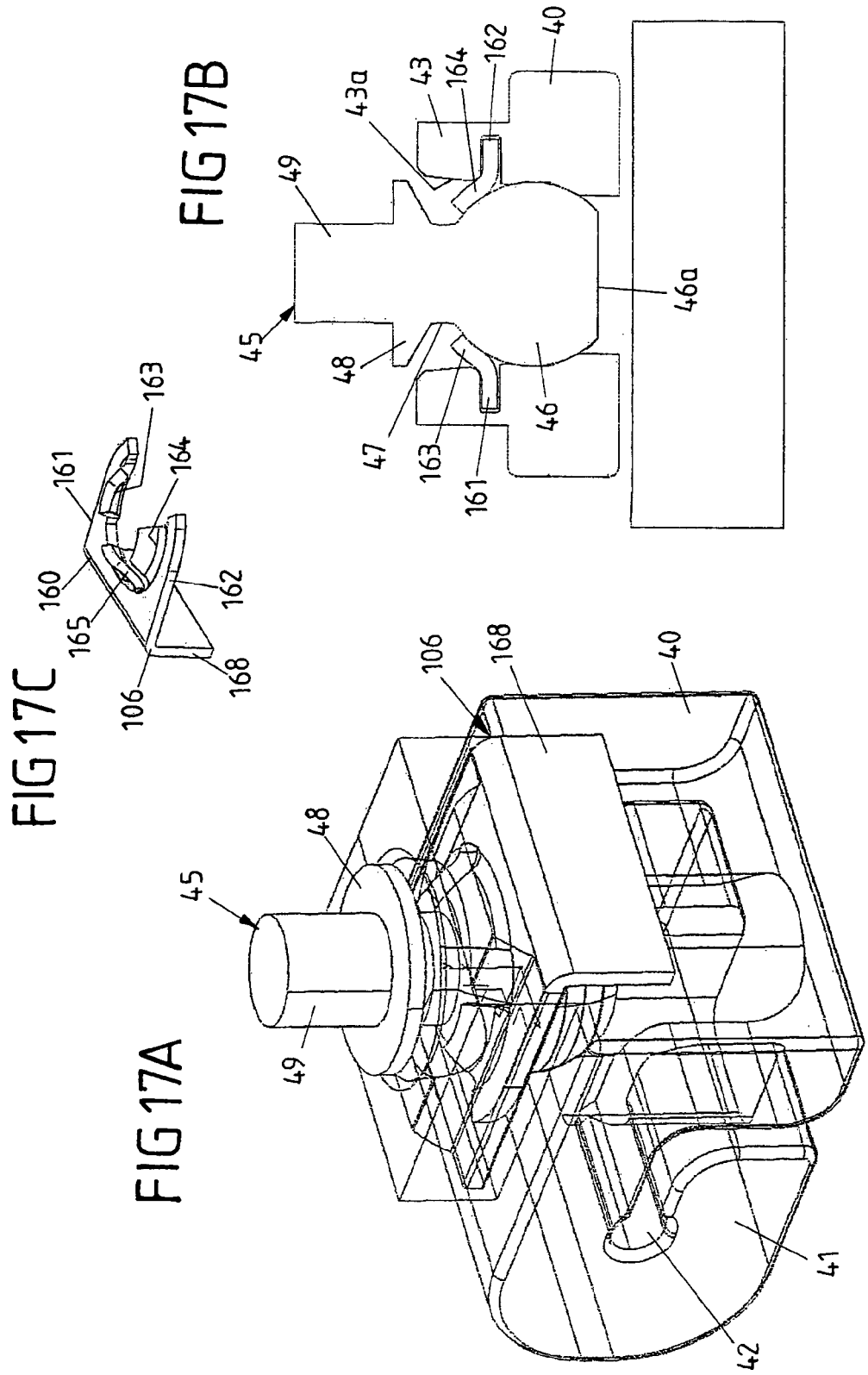

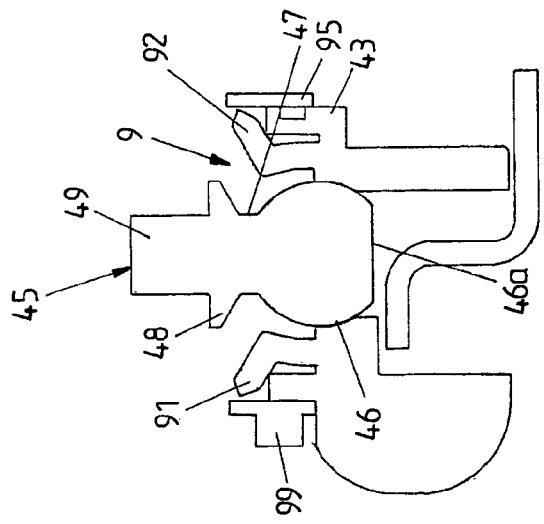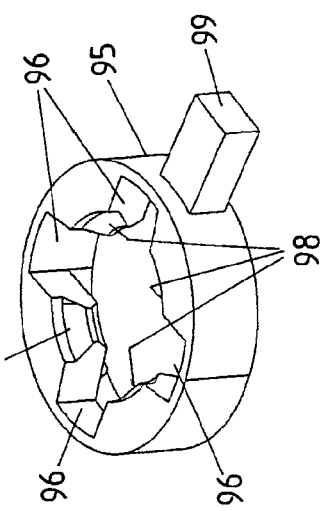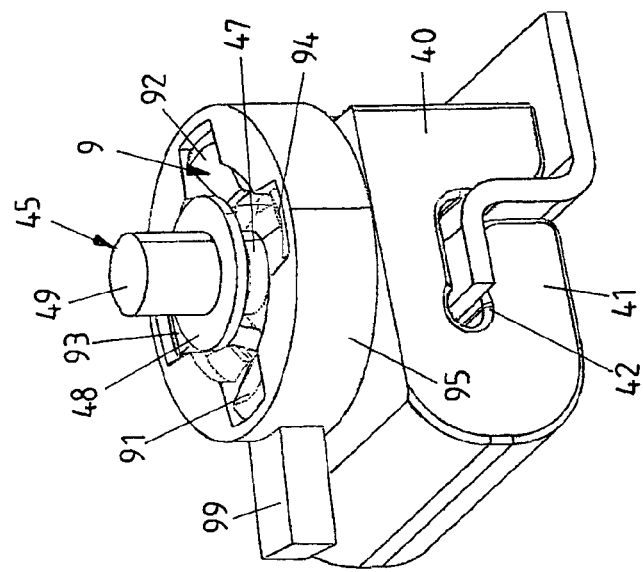

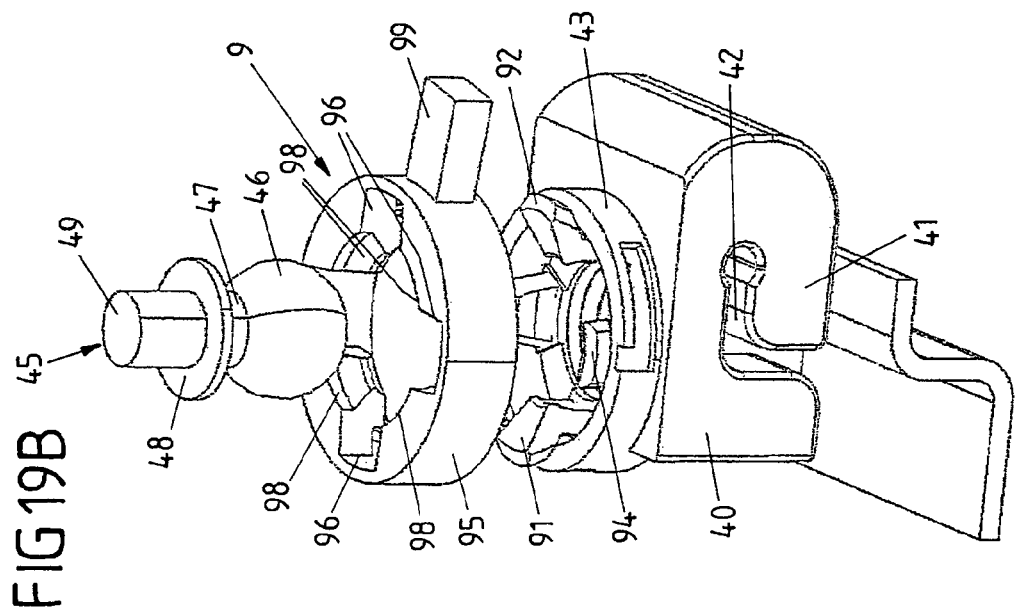
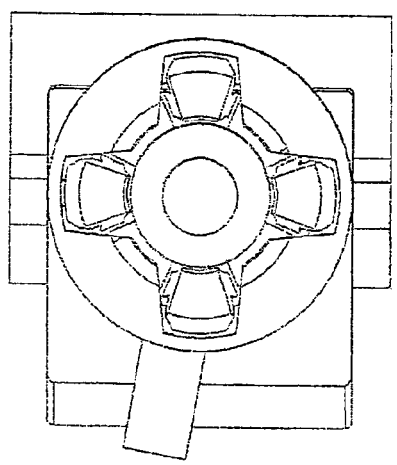

PATH-CONTROLLED ADJUSTMENT DEVICE WITH A MULTIPART CARRIER ASSEMBLY

CROSS-REFERENCE TO RELATED APPLICATIONS

This application is a National Phase Patent Application of International Patent Application Number PCT/EP2012/004563, filed on Nov. 2, 2012, which claims priority of German Patent Application Number 10 2011 085 742.7, filed on Nov. 4, 2011, the disclosures of which are hereby incorporated by reference in their entireties.

BACKGROUND

This invention relates to a path-controlled adjustment device for a window pane of a motor vehicle.

Such path-controlled adjustment device, also called path-controlled window lifter, comprises a carrier assembly on which at least three guideways are provided, which define an adjustment path for an adjustable window pane and which are spaced from each other transversely to the adjustment path. The carrier assembly in principle can have a one-part or multipart design and in particular be equipped for incorporation into a motor vehicle door which contains a window pane to be adjusted by means of a window lifter.

For guiding an adjustable window pane along the adjustment path defined by the guideways, a driver is used here, which on the one hand includes means for connection of the window pane to be adjusted and which on the other hand is provided with guiding elements, such that with each of the at least three carrier-side guideways at least one guiding element each of the driver—movable along the associated guideway—is in engagement.

By coupling such driver, as known, with a window lifter drive, e.g.—in the case of a so-called cable window lifter— via a flexible pulling means which is connected with the driver, with a manual or motorized drive, the driver—guided by the carrier-side guideways—can be moved along the adjustment path defined by those guideways. The window pane to be adjusted, which is connected to the driver, is entrained thereby, in order to clear or close an associated window opening, depending on the direction of movement of the pane.

Path-controlled window lifters are used for example for adjusting window panes for frameless doors of a motor vehicle, e.g. in convertible cars. Beside the definition of a main adjustment direction in pull-off direction of the window pane, i.e. substantially the vertical vehicle axis (z-axis), the guideways usually serve for guiding the driver and the window pane connected thereto with a component of movement along the horizontal transverse vehicle axis (y-axis), i.e. vertically both to the vertical vehicle axis (z-axis) and to the longitudinal vehicle axis (x-axis). The guidance of the window pane with a component along the horizontal transverse vehicle axis (and hence vertically to the plane which is defined by the door into which the window lifter is to be incorporated) can be utilized, in order to press the window pane to the inside against a body-side seal, when closing the window opening, and thus ensure a safe closing of the window opening. In addition, the guideways also can force components of movement along the longitudinal vehicle axis (x-axis) on the driver and the window pane connected thereto, so that complex adjusting movements can be realized, which provide for an adaptation to a variety of different types of motor vehicle doors.

The associated carrier assembly here has a multipart, i.e. at least two-part design and comprises at least two carrier elements which are connected with each other at a plurality of fixing points. The adaptation to different designs of motor vehicle doors thereby is facilitated in that individual elements of the carrier assembly selectively can be adapted to different door surroundings. The carrier assembly, however, at the same time should be able to absorb and dissipate large forces which can act at the carrier assembly in operation of the adjustment device.

SUMMARY

Therefore, it is a problem underlying the invention to create an adjustment device as mentioned above with a multipart carrier assembly, which with simple means ensures a sufficient strength or rigidity of the carrier assembly.

According to an exemplary embodiment of the invention, in a generic adjustment device it is furthermore provided that on at least one of the carrier elements the fixing points, via which that carrier element is connected with a further carrier element of the carrier assembly, are connected with each other by reinforcement paths.

The reinforcement paths are formed by longitudinally extending formations or continuous profilings of the corresponding carrier element, which connect individual fixing points with each other. For example, this can be material retractions, such as e.g. beads, material bulges, such as e.g. ribs, or also more complex profilings of said carrier element, which also can comprise a combination of material retractions and material bulges.

That two fixing points of the guiding element are connected with each other via a reinforcement path, in particular can be effected such that the respective reinforcement path merges into the corresponding fixing point or adjoins the same, so that it touches the fixing point. The fixing points thus can form in particular nodal points in the entirety of the reinforcement paths.

In the carrier element observed, the fixing points can comprise e.g. mounting openings through which associated fixing means can extend; and they can also comprise suitable reinforcement regions, e.g. in the form of (pot-like) material retractions or bulges. In this case, the reinforcement paths each merge into the reinforcement regions belonging to the fixing points or adjoin the same.

Furthermore, the fixing points in particular can be arranged such that they are spaced from each other along the main adjustment direction of the window pane or the associated driver (pull-off direction). Furthermore, the fixing points each can be spaced from each other transversely to that direction, in particular alternately each be located closer to a first and a second guideway which is provided on the carrier element.

The carrier element can be a so-called guide plate, which includes at least two guideways and which is connected with a further carrier element in the form of a module carrier, which (together with the guide plate) is to be mounted in a motor vehicle door and for example can cover there a large-surface cutout of the door structure, in particular of the door inner skin. At the module carrier there can also be provided (at least) one guideway.

According to an exemplary embodiment of the invention the carrier element serving as guiding element or guide plate is made of a stronger material, e.g. of metal or fiber-reinforced plastic material, than the carrier element serving as module carrier, which in particular can be fabricated of plastic material.

On the carrier element formed as guiding element or guide plate in particular those guideways are provided at which particularly large forces or moments can act in operation of the adjustment device.

BRIEF DESCRIPTION OF THE DRAWINGS

Further details and advantages of the invention will become apparent from the following description of exemplary embodiments with reference to the Figures.

FIG. 1A shows a front view of a carrier assembly with a path-controlled device for adjusting a window pane of a motor vehicle, wherein a driver carrying the window pane is guided in three guideways.

FIG. 1B shows a rear view of the arrangement of FIG. 1A.

FIG. 2A shows a first perspective view of the arrangement of FIGS. 1A and 1B.

FIG. 2B shows a second perspective view of the arrangement of FIGS. 1A and 1B, but without driver.

FIG. 3 shows a perspective view of a section of the arrangement of FIGS. 1A and 1B.

FIG. 4A shows a cross-section through the arrangement of FIGS. 1A and 1B.

FIG. 4B shows a segment of the cross-section of FIG. 1A.

FIG. 5A shows a detail concerning the engagement of a guiding element of the driver into a carrier-side guideway, wherein a bearing element is associated to the guiding element, via which the guiding element is pivotally connected with the driver.

FIG. 5B shows a securing element in the form of a securing clip for securing the bearing element of FIG. 5A at the associated guiding element.

FIG. 5C shows a perspective representation of the arrangement of FIG. 5A, by means of which the insertion of the securing element is illustrated.

FIG. 5D shows a sectional representation of the arrangement of FIG. 5A with inserted securing element.

FIG. 6A shows a further front view of the arrangement of FIGS. 1A and 1B.

FIG. 6B shows a further rear view of the arrangement of FIGS. 1A and 1B.

FIG. 7A shows a further perspective view of the arrangement of FIGS. 1A and 1B, but without driver.

FIG. 7B shows a perspective representation of a guide plate of the arrangement of FIG. 7A.

FIG. 9A shows a perspective representation of a first modification of the arrangement of FIGS. 5A to 5D with a guiding element on which a securing element is premounted, and a bearing element to be inserted into the guiding element, wherein an additional locking element is associated to the securing element.

FIG. 9B shows a cross-sectional representation of the arrangement of FIG. 9A.

FIG. 9C shows a perspective representation of the securing element of FIGS. 9A and 9B.

FIG. 10A shows a perspective representation according to FIG. 9A during insertion of the bearing element into the guiding element.

FIG. 10B shows a perspective representation according to FIG. 9B during insertion of the bearing element into the guiding element;

FIG. 11A shows a perspective representation according to FIGS. 9A and 10A with inserted bearing element.

FIG. 11B shows a sectional representation according to FIGS. 9B and 10B with inserted bearing element, wherein an additional locking element is associated to the securing element.

FIGS. 13A, 13B show the arrangement of FIGS. 12A and 12B during insertion of the bearing element into the guiding element.

FIG. 15A shows a perspective representation of a modification of the arrangement of FIGS. 5A to 5D with regard to the design of the securing element.

FIG. 15B shows a cross-sectional representation of the arrangement of FIG. 15A.

FIG. 15C shows a perspective representation of the securing element of FIG. 15A.

FIG. 16A shows a perspective representation of a further modification of the arrangement of FIGS. 5A to 5D with regard to the design of the securing element.

FIG. 16B shows a cross-sectional representation of the arrangement of FIG. 16A.

FIG. 16C shows a perspective representation of the securing element of FIG. 16A.

FIG. 17A shows yet a further modification of the arrangement of FIGS. 5A to 5D with regard to the design of the securing element in a perspective representation.

FIG. 17B shows a cross-section through the arrangement of FIG. 17A.

FIG. 17C shows the securing element of FIG. 17A in a perspective representation.

FIG. 18A shows a perspective representation of a guiding element with integrally molded securing element, a partly inserted bearing element and an associated crown-shaped locking element.

FIG. 18B shows a cross-sectional representation of the arrangement of FIG. 18A.

FIG. 18C shows a perspective representation of the locking element of FIG. 18A.

FIG. 19A shows a top view of the arrangement of FIGS. 18A and 18B.

FIG. 19B shows a detail representation of the arrangement of FIGS. 18A and 18B.

DETAILED DESCRIPTION

Figure 8A:
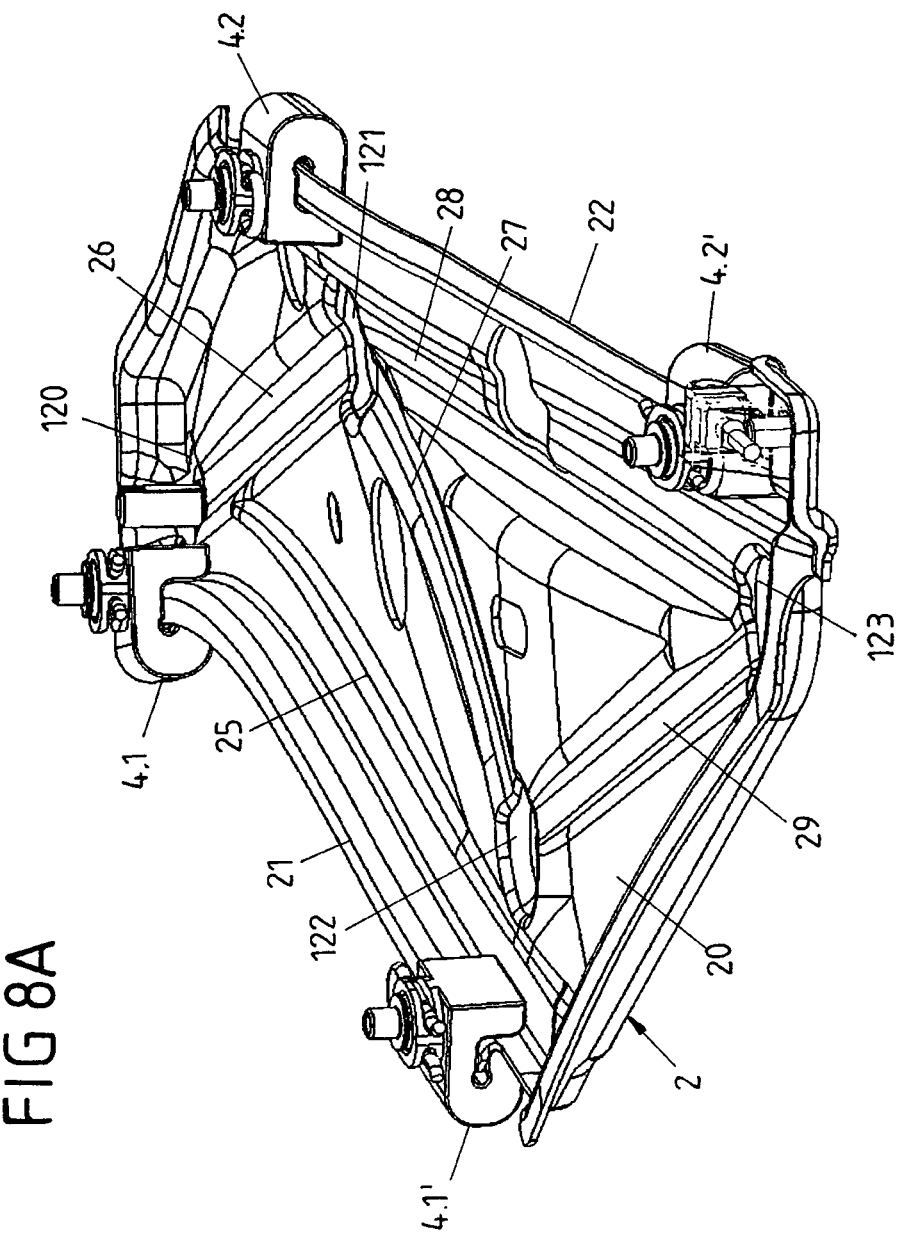
FIGS. 8A and 8B show two further perspective representations of the guide plate of FIG. 7B.

FIGS. 1A and 1B show a front view (FIG. 1A) and a rear view (FIG. 1B) of a carrier assembly 1, 2 which is formed and provided for accommodating a path-controlled device for adjusting a window pane of a motor vehicle. The carrier assembly 1, 2 comprises a module carrier 1 with a (plate-like) base body 10. The same for example can be made of plastics or also of light metal and is equipped for incorporation into a motor vehicle door, so that in its condition properly mounted in a motor vehicle door the module carrier 1 forms a part of the door body, in particular a part of the so-called door inner skin. For this purpose the vehicle door, in particular in its door inner skin, can include a large-surface cutout which is covered by the module carrier 1 when the same is properly mounted in the motor vehicle door (and attached to the same).

What is connected with and attached to the module carrier 1 is a guide component 2 of the carrier assembly 1, 2, at which two guideways 21, 22 are provided, integrally molded in the exemplary embodiment, which serve for guiding a driver 3, here in the form of a lifting rail, which in turn carries a window pane to be adjusted along the guideways. A third guideway 13 for guiding the driver 3 is provided at the module carrier 1 or integrally molded thereto.

The guide component 2 of the carrier assembly 1, 2 is arranged and fixed at the module carrier 1 such that the guide component 2 rests on the module carrier 1. In the present case, however, the guide component 2—as compared with the module carrier 1—has a substantially smaller expansion (along the door plane, based on the condition of the module carrier 1 mounted in a motor vehicle door). As a result, the guide component 2 only partly covers the module carrier 1; and the guideway 13 on the side of the module carrier is provided at a region of the module carrier 1 not covered by the guide component 2.

The guide component 2, which here includes a plate-like base body 20, can be made of a stronger, stiffer material—as compared to the material of the module carrier 1—, in particular of metal or a (fiber-)reinforced plastic material. Therefore, those guideways 21, 22 advantageously are arranged or integrally molded at the guide plate 2, which in operation of the adjustment device can be exposed to particularly great loads.

The guide component 2 (in the form of a guide plate) and the module carrier 1 are connected with each other at several fixing points 121, 122, 123, whose design will yet be described in more detail below. In the exemplary embodiment, the connection is such that a substantially rigid carrier assembly 1, 2 is formed. Due to the plate-like design both of the module carrier 1 and of the guide component 2 and due to their overlapping arrangement, the same likewise extends in a substantially plate-like manner, namely—when properly mounted in a motor vehicle door—substantially along a door plane, e.g. a plane defined by the door inner skin.

The driver 3 is guided on the carrier assembly 1, 2 or more exactly on the guideways 21, 22, 13 provided at the carrier assembly. In the exemplary embodiment, guiding elements in the form of sliders 4.1, 4.2, 4.3 attached to the driver 3 each engage in one of the guideways 21, 22, 13, namely such that the respective slider can be moved or shifted in the associated guideway along its respective (local) direction of extension. For the sake of simplicity, the guiding elements subsequently each are referred to as sliders, which however should not involve a limitation to the design of the guiding elements as sliders. Rather, the following designs apply, which are described by way of example for guiding elements in the form of sliders, each also for arbitrary guiding elements in general, via which the driver 3 can be in engagement with the guideways 21, 22, 13.

The guideways 21, 22, 13, which each are provided, in particular integrally molded, at the guide component 2 or the module carrier 1, do not extend straight and in particular not parallel to each other. Rather, the individual guideways 21, 22, 13 are (at least slightly) curved in different ways, namely not only in the plane (door plane or xz plane) along which the carrier assembly 1, 2 extends and which is defined by the longitudinal vehicle axis x and the vertical vehicle axis z, but also with a component vertical to that plane, i.e. along the horizontal transverse vehicle axis y.

For lifting or lowering a window pane to be connected with the driver 3 in the usual way, the driver 3 thereby cannot only simply be moved linearly along a direction in space, in particular the vertical vehicle axis z, but can be moved or shifted along more complex paths. On the one hand, this provides for an adaptation of the adjustment operation of a window pane to complex door structures and on the other hand in particular for approaching a body-side seal in a defined way in the case of frameless vehicle doors.

In the case of a window pane to be lifted or lowered in the usual way by shifting the driver 3, in order to herewith close or clear a window opening, the vertical vehicle axis z forms the so-called main adjustment direction, i.e. the main component of the adjusting movement of the driver 3 and hence also of the window pane attached thereto. However, the same is superimposed by components of movement both along the longitudinal vehicle axis x and along the horizontal transverse vehicle axis y, in order to provide for the above-described more complex movements of the driver 3 during an adjustment of the window pane.

In the exemplary embodiment of FIGS. 1A to 4B, the guideways 21, 22, 13 are formed as guide profiles, which each comprise a guide leg (substantially vertically) protruding from the carrier assembly 1, 2, which by its extension along the carrier assembly 1, 2 defines a respective guideway 21, 22, 13.

The sliders 4.1, 4.2, 4.3 enclose the longitudinally extending guide leg of the respective guideway 21, 22, 13. This can be recognized more clearly in particular with reference to FIGS. 3, 4A and 4B, according to which the guideways 21, 22, 13 each comprise an angled guide leg 210, 220, 130 protruding from the carrier assembly 1, 2, whose respective angled end portion 212, 222, 132 is enclosed by the respective slider 4.1, 4.2, 4.3, for which purpose each of the sliders 4.1, 4.2, 4.3 includes a base body 40 with an enclosing region 41 which defines a recess for accommodating the angled end portion 212, 222, 132 of the respective guide leg. With a proper arrangement of the respective slider 4.1, 4.2, 4.3 on the associated guideway or its guide profile, the angled end portion 212, 222, 132 of the respective guide leg 210, 220, 130 engages into the slot-shaped receptacle 42 of the respective slider 4.1, 4.2, 4.3 and in the process is reached under by its enclosing region 41. The enclosing regions 41 here are formed identically on each of the sliders 4.1, 4.2, 4.3.

As a result, the respective slider 4.1, 4.2, 4.3 is longitudinally shiftably mounted on the guide profile or more exactly the guide leg of the respective guideway 21, 22, 13, wherein a positive engagement exists between the respective slider and the associated guide profile. The concrete realization of the positive connection of course can differ from the cooperation of the enclosing region 42 of a respective slider with the angled end portion 212, 222, 132 of the associated guide profile, which has been described above by way of example.

To shift the driver 3 along the guideway 21, 22, 13, in particular to lift or lower the same, an adjustment drive 5 is provided at the carrier assembly 1, 2, in the present case concretely at the module carrier 1. In the exemplary embodiment, the same comprises a drive motor 50, an associated control unit 51, e.g. in the form of an electronic module, and an adjusting gear unit 52 arranged after the drive motor 50. The adjusting gear unit serves for converting a driving torque produced by the drive motor 50 into an adjusting movement, in order to be able to shift the driver 3 along the guideways 21, 22, 13. In the exemplary embodiment, the adjusting gear unit 52 is formed as so-called cable drum transmission. This means that on its output side the adjusting gear unit 52 includes a cable drum which is driven by means of the drive motor 50 (so that it rotates about an axis) and around which a flexible pulling means Z is wound, which in turn is connected with the driver 3.

To guide the flexible pulling means Z coming from the adjustment drive 5 such that it extends in the usual way with an adjustment portion (not shown here) along the adjustment direction of the driver 3, deflection elements 55, 56 are provided at the carrier assembly 1, 2, concretely at the module carrier 1.

In operation of the drive motor 50, the output-side cable drum of the adjusting gear unit 52—depending on the activation direction of the motor—is rotated along the one or other direction, wherein the adjustment portion of the flexible pulling means Z wound around the cable drum substantially moves up or down along the vertical vehicle axis z and in doing so entrains the driver 3 connected to the adjustment portion of the flexible pulling means, so that a window pane fixed at the driver 3 is lifted or lowered.

In FIG. 2B, the sliders 4.1, 4.2 and 4.3, via which the driver 3 is in engagement with the guideways 21, 22, 13, each are shown in an upper adjustment position—as seen along the respective guideway—and in addition in a lower adjustment position, there provided with the reference numerals 4.1', 4.2' and 4.3'.

The fixation of the above-described carrier assembly 1, 2 at a vehicle door is effected via fixing means B1, B2, B3, which are indicated in FIGS. 1A to 3. For this purpose, the fixing methods known from the prior art can be employed, wherein on at least one fixing point (B2) an adjustable fixation at the vehicle door or door body can be provided, for example in order to compensate tolerances.

According to a module construction, the carrier assembly 1, 2 initially can be equipped with the above-described elements of a window lifter, before it is properly mounted in a motor vehicle door and fixed there.

Due to the guidance of the driver 3 (here in the form of a lifting rail) on for example a total of three guideways 21, 22, 13 spaced from each other, wherein a spacing is provided in particular transversely to the main adjustment direction z of the driver 3, an overdetermination of the system does exist here. This means that even minimum tolerances already might lead to a jamming of the driver 3 or more exactly of the associated sliders 4.1, 4.2, 4.3 in the guideways 21, 22, 13 or the associated guide profiles.

To avoid strain or even jamming of the system as a result of an overdetermination, the respective slider 4.1, 4.2, 4.3, which serves for guiding the driver 3 in the guideways 21, 22, 13, pivotally is in engagement with the driver 3. In the exemplary embodiment of FIGS. 1A to 4B, a ball head bearing is provided for supporting the respective slider 4.1, 4.2, 4.3, of which one is shown in FIG. 4B by way of example. The enclosing regions 41 of the sliders 4.1, 4.2, 4.3 thereby can remain free from means for tolerance compensation.

In the exemplary embodiment, the respective slider concretely is connected with the driver 3 via a bearing element 45 which for forming a joint includes a bearing head 46, e.g. in the form of a ball head which is mounted in an associated bearing region 43. The bearing region selectively can be associated to the driver 3 or the respective slider 4.1, 4.2, 4.3 or be arranged thereon. According to the variant shown in the Figures, the bearing region 43 provided for accommodating the bearing head 46 each is formed at the slider 4.1, 4.2, 4.3.

The bearing region 43 is designed such that the bearing head 46 can be pivoted therein in all directions in space, in order to be able to compensate tolerances along arbitrary directions and thereby avoid strain. In the present case, the bearing head 46 only partly is formed spherical and for example includes a flattened top surface 46*a*. With a further bearing portion 49 pin-like in the exemplary embodiment, the bearing element 45 is mounted at the driver 3, more exactly in a (circular) opening 31 of the driver 3.

The bearing advantageously is such that a rotary movement of the bearing element 45 in the associated bearing region 43 by up to 5°, in particular by up to 7.5° or 10°, is possible along any direction in space.

In addition, a securing element 6 (here a securing clip) is associated to the bearing element 45, which in the exemplary embodiment of FIGS. 4*a* and 4*b* for example engages a taper or cutout 47 of the bearing element 45, which here for example is located between the bearing head 46 and a collar 48 of the bearing element 45. More details can be taken from FIGS. 5A to 5D. Accordingly, the securing element is designed substantially U-shaped with a base 60 and two legs 61, 62 protruding therefrom, cf. FIG. 5B, which each positively (on opposite sides) engage into the (circumferential) cutout 47 of the bearing element 45, when the securing element 6 is properly inserted into the bearing region 43 of the corresponding slider.

According to FIG. 5A, the bearing element 45 initially is inserted with its bearing head 46 (in the form of a ball head with flattened top surface 46*a*) into the bearing region 43 of the associated slider, so that the bearing head 46 is accommodated in a receptacle 43*a* defined by the bearing region 43, as shown in FIG. 5A.

According to FIGS. 5C and 5D, the U-shaped securing element 6 (with its two legs 61, 62) shown in FIG. 5B subsequently is introduced into the receptacle 43A of the bearing region 43 such that the two legs 41, 42 of the securing element positively engage into the circumferential cutout 47 of the bearing element 45 and thereby (captively) hold the bearing element 45 in the bearing region 43. The securing element 6 or both legs 61, 62 are guided by guiding portions 431, 432 in the form of guide openings of the bearing region 43 and thereby also are accommodated at the bearing region 43.

Due to the positive engagement of the securing element 6 into the bearing element 45, especially in that the legs 61, 62 of the securing element 6 engage into the cutout 47 of the bearing element 45, the bearing element 45 is safely held in the bearing region 43 even under the influence of large forces. For removing the bearing element 45 from the bearing region 43 it is required to move the securing element 6 out of the securing position shown in FIGS. 5C and 5D, in which it holds the bearing element 45 inside the bearing region 43.

As indicated in FIG. 5B in broken lines, the legs 61, 62 of the securing element 6 can slightly be bent to the outside at their free ends, in order to facilitate an introduction of the securing element. Alternatively or in addition, a lead-in chamfer or another inclined surface or rounding for example can also be formed at the legs 61, 62 for this purpose.

With reference to FIGS. 3, 4A and 4B it is furthermore shown that the bearing element 45, via which the respective slider 4.1, 4.2, 4.3 is connected with the driver 3, is arranged above the guiding leg 210, 220, 130 of the respective guideway 21, 22, 13. Expressed in other words, a vertical projection P of the guiding element 45 onto the carrier assembly 1, 2, i.e. a projection P directed vertically to the main plane of extension of the carrier assembly 1, 2, intersects the guiding leg 210, 220, 130 of the respective guiding profile. The latter means that an axis A, along which the respective guiding leg 210, 220, 130 proceeds from the carrier assembly 1, 2 and which extends in the guiding leg itself, lies within a region B which—in a cross-section along the xy-plane, as shown in FIGS. 4A and 4B—is defined by two lines which in each cross-sectional plane (xy-plane) in turn laterally define the bearing body 46. The xy-plane is that plane which extends vertically to the vertical vehicle axis z.

Due to the fact that the bearing element 45, which connects the driver 3 with the respective slider 4.1, 4.2, 4.3, is arranged above the guiding leg 210, 220, 130 of the respectively associated guiding profile (guideways 21, 22, 13), forces occurring at the driver 3, which are transmitted to the associated guiding profile via the respective bearing element 45 and the respective slider 4.1, 4.2, 4.3, directly act on its respective guiding leg 210, 220, 130, without substantial lever forces being produced (which would occur in particular when the respective bearing element 45 was spaced from the associated guiding leg 210, 220, 130 along the x-axis). Tilting moments during the cooperation of the driver 3 with the guideways 21, 22, 13 should be reduced thereby.

In particular, with the described arrangement of the axis A of the respective guiding leg inside the region B defined by the bearing head 46, the lateral lever arm cannot exceed the radius (0.5*B) of the bearing head 46 when the driver 3 cooperates with the respective guiding profile in terms of force.

Figure 8B:
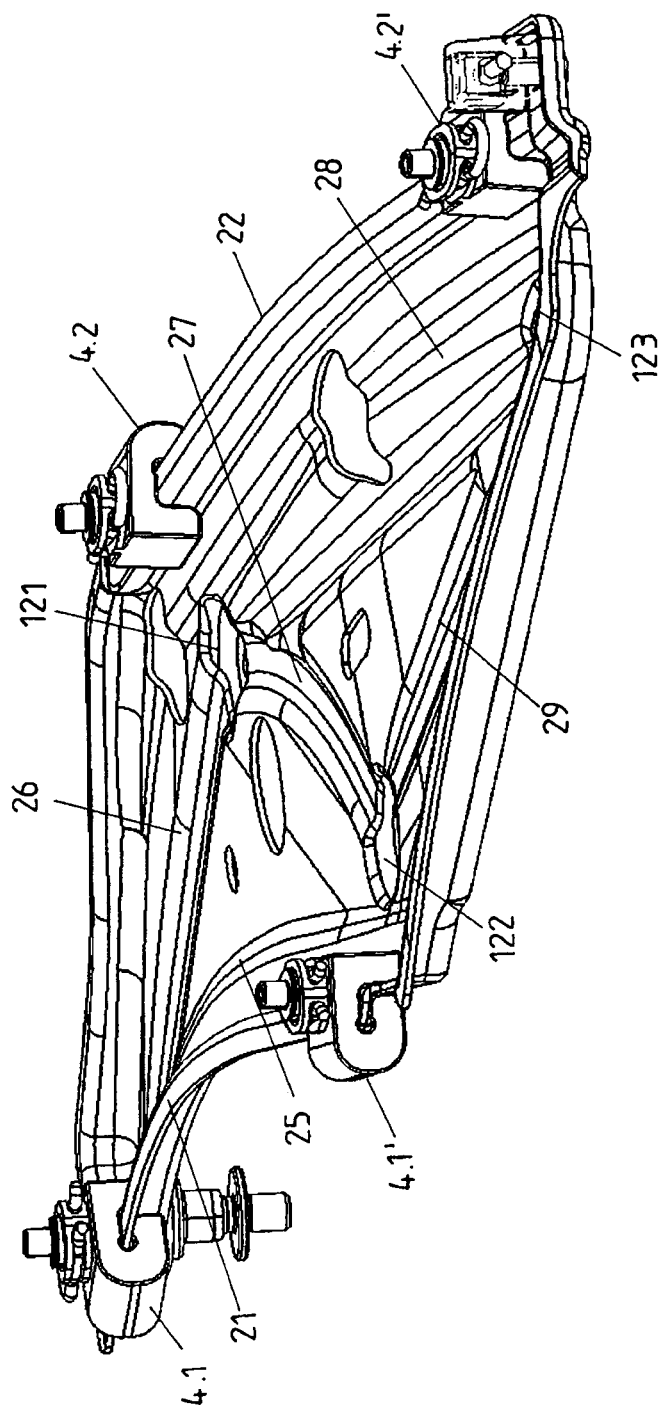
Figure 12B:
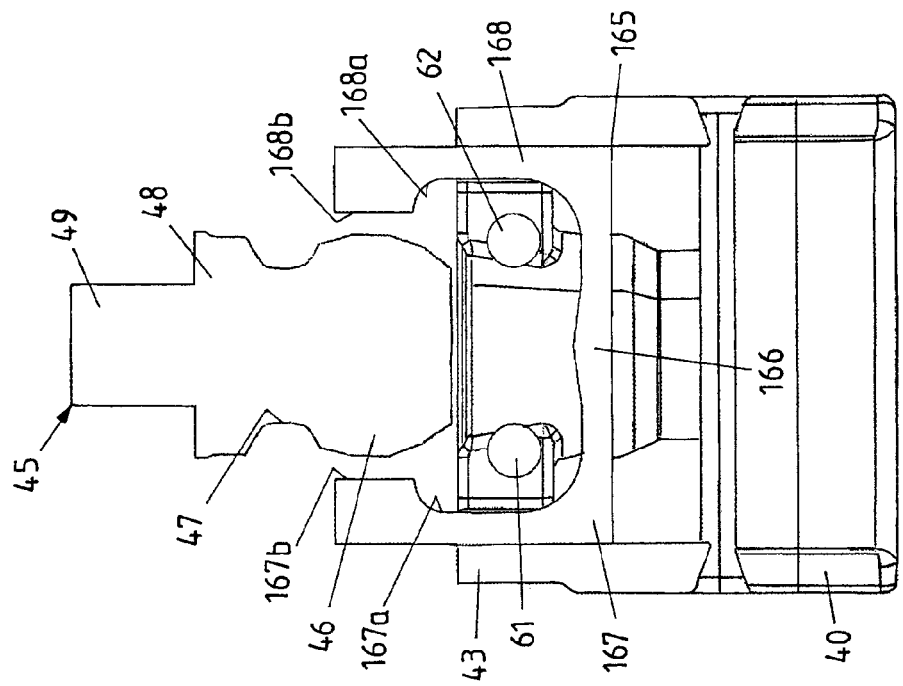
FIGS. 12A, 12B show a modification of the arrangement of FIGS. 9A and 9B with regard to the design of the additional locking element.
Figure 12A:
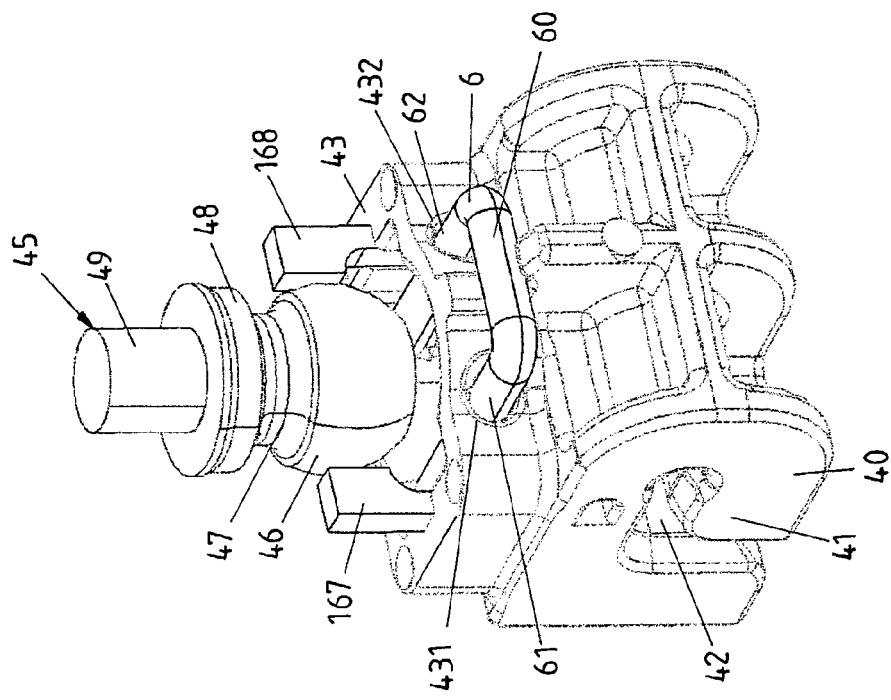

As becomes clear with reference to FIGS. 6A to 8B, which show further representations of the exemplary embodiment of FIGS. 1A to 4B, the module carrier 1 and the guide plate 2, as each shown individually in FIGS. 7B, 8A and 8B, are connected with each other at several fastening points 120, 121, 122, 123 for forming a carrier assembly 1, 2, as shown in FIGS. 6A to 7A. At the guide plate 2, the fastening points 120, 121, 122, 123 each are formed by mounting openings which in the present case are provided in (pot-like) material retractions according to the exemplary embodiment. To these fastening points usual fastening means, e.g. in the form of screws or rivets, then can be associated.

Among other things, a fixing element B1 for example each is indicated in the Figures, which provides for a connection of the module carrier 1 and the guide plate 2 adjustable along the y-axis, i.e. vertically to the (xz-) plane defined by the carrier assembly 1, 2.

The fixing points 120, 121, 122, 123 are connected with each other at the guide plate 2 via connecting and reinforcement regions 25, 26, 27, 28, 29, which each are molded out of the guide plate 2 or its base body 20 as connecting or reinforcing profiles and form reinforcement paths in the form of longitudinally extending profiles. The reinforcement paths 25 to 29 for example can be formed by beads, ribs, material bulges, material doublings and the like.

It is important that the reinforcement paths each are connecting or reinforcing regions extending along the guide plate 2 or its base body 20, which locally each are formed by formations at the guide plate 2 or its base body 20.

That the reinforcement paths 25 to 29 connect the fixing points 120 to 123 with each other means that into the fixing points 120 to 123 or their material retraction one of the reinforcement paths 25 to 29 each merges or adjoins thereto. Adjoin here should mean in particular that the respective reinforcement path touches the material retraction of the associated fixing point.

In particular with reference to FIGS. 6A, 7A and 8A it can be seen that several reinforcement paths 26, 27, 28, 29 each merge into the material retractions of fixing points 120, 121, 122, 123, while a further reinforcement path 25 directly adjoins the material retractions of two fixing points 120, 122, so that it touches the same.

The fixing points 120 to 123 or their material retractions form nodal points in a network of reinforcement paths 25 to 29. Expressed in other words, the reinforcement paths 25 to 29 connect the fixing points 120 to 123 by forming a net-like structure (reinforcing net). The fixing points 120 to 123, via which the guide plate 2 and the module carrier 1 are connected with each other, advantageously are arranged such that they ensure an optimum power transmission in all positions of the driver 3 along the associated guideways 21, 22, 13.

The fixing points 120 to 123 therefore are arranged one behind the other along the main adjustment direction z of the driver 3 and at the same time arranged spaced from each other along the direction x transversely to the main adjustment direction z, namely in the exemplary embodiment such that the fixing points 120 to 123 alternately are located close to the first guideway 21 and close to the second guideway 22 of the guide plate 2.

Advantageously, all fixing points 120 to 123 are connected with at least one each of the reinforcement paths 25 to 29, wherein in the exemplary embodiment at least two reinforcement paths 25 to 29 each merge into each fixing point 120 to 123 or touch the same. In the case of the two edge-side fixing points 120 and 123 which, as seen along the main adjustment direction z, form the upper and lower end of the reinforcing net, these concretely are two reinforcement paths each and in the case of the fixing points 121, 122 arranged inbetween along the z-direction these are three reinforcement paths each.

By such a structure a maximum rigidity both of the guide plate 2 itself and of the carrier assembly comprising module carrier 1 and guide plate 2 can be achieved with minimum weight.

With reference to FIGS. 10A to 21B different exemplary embodiments will be explained below, as to how the bearing element 45 can reliably be secured inside the bearing region 43, wherein at the same time a rather easy assembly of the securing means required for this purpose should be possible.

The arrangement of FIGS. 9A to 11B shows a development of the exemplary embodiment described with reference to FIGS. 5A to 5D, by using a U-shaped securing element 6 (preferably made of metal or plastics) with a base 60 and two legs 61, 62 protruding therefrom, which conforms in terms of its basic structure, wherein in the present case, however, the securing element 6 is arranged at the bearing region 43 such that it is spread apart during the insertion of the bearing element 45 into the bearing region 43.

For this purpose, the securing element 6, cf. FIG. 9C, is inserted into the bearing region 43, before the bearing element 45 is incorporated there according to FIGS. 9A to 9B. The securing element 6 in turn is held in a defined way at the bearing region by means of guides 431, 432.

In the present case, the material of the securing element 6 and/or its cross-section are chosen such that the securing element 6 already properly positioned at the bearing region 43 can be spread apart by the bearing head 46 of the bearing element 45, when the latter is introduced into the interior 43a of the bearing region 43, as is shown in FIGS. 10A and 10B.

After the complete insertion of the bearing element 45 into the interior 43a of the bearing region 43, the securing element 6 with its legs 61, 62 snaps into the (circumferential) cutout 47 of the bearing element 45, in order to hold the same inside the bearing region 43.

In this condition, spreading apart of the securing element 6 to the outside is prevented by an additional, secondary securing element (locking element) 65, which here by way of example is designed as locking spring. According to FIGS. 11A and 11B, it furthermore is designed U-shaped in the exemplary embodiment, with a base 66 and two legs 67, 68 protruding therefrom, which rest against the outside of the legs 61, 62 of the securing element 6 and thereby prevent them from being spread apart. The legs 67, 68 of the secondary securing element or locking element 65 are supported on wall portions of the bearing region 43.

As becomes clear with reference to FIGS. 9A and 9B, the secondary securing element/locking element 65 already is arranged in the interior 43a of the bearing region 43, before the bearing element 45 is introduced there. In this condition, however, the locking legs 67, 68 of the locking element 65 still are located below the legs 61, 62 of the securing element 6, so that spreading apart of the same is not blocked, when the bearing element 45 is introduced according to FIGS. 10A and 10B. The locking legs 67, 68 of the locking element 65 are oriented vertically to the legs 61, 62 of the securing element 6, the latter being located in the insertion path of the bearing element 45 into the bearing region 43 as shown in FIGS. 10A and 10B.

On its base 66 serving as bottom, the locking element in the form of a locking spring includes an actuating portion 69 in the form of a formation which points into the interior space 43a of the bearing region 43 and in doing so concretely in direction of the insertion path of the bearing element 45 into that bearing region 43. During insertion of the bearing element 45 into the bearing region 43 by spreading apart the securing element 6, as shown in FIGS. 10A and 10B, the bearing element 45 finally gets in contact with the actuating portion 69 of the locking element or secondary securing element 65 via its bearing head 46 or its flattened top surface 46a and presses onto the actuating portion 69 such that the formation is eliminated and the base 66 of the locking element 65 assumes a substantially straight shape, as can be seen in FIG. 11B. The locking legs 67, 68 inside the bearing region 43 thereby are slightly shifted to the top, so that the locking legs 67, 68 come to lie beside the legs 61, 62 of the securing element 6 and fix the same inside the bearing region 43, in particular secure their engagement into the cutout 47 of the bearing element 4.

In FIGS. 12A to 14B a modification of the exemplary embodiment of FIGS. 9A to 11B is shown, wherein the essential difference consists in the design of the secondary securing element/locking element 165, which in the exemplary embodiment of FIGS. 12A to 14B in turn includes a base 166 and legs 167, 168 protruding therefrom. The legs 167, 168 of the locking element 165, however, each include an inwardly directed recess 167a, 168a in their region adjacent to the base 166, in which recess the securing element 6 is accommodated when the same already is arranged in the bearing region 43 together with the locking element 165, before the bearing element 45 is inserted, cf. FIGS. 12A and 12B.

During the subsequent insertion of the bearing element 45 into the bearing region 43, as shown in FIGS. 13A and 13B, the recesses 167a, 168a permit spreading apart of the securing element 6 or its legs 61, 62 and at the same time act as connecting link guide for each leg 61, 62, as can be seen with reference to the insertion movement E of the bearing element 45 into the bearing region 43 as shown in FIGS. 13A and 13B.

Figure 14B:
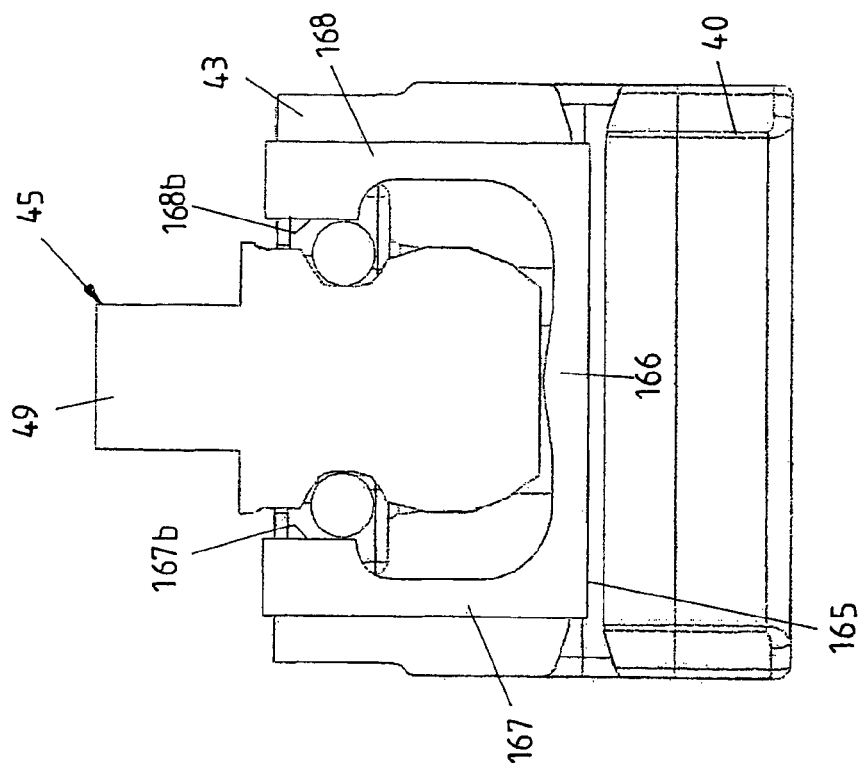
FIGS. 14A, 14B show the arrangement of FIGS. 12A and 12B with fully inserted bearing element.
Figure 14A:
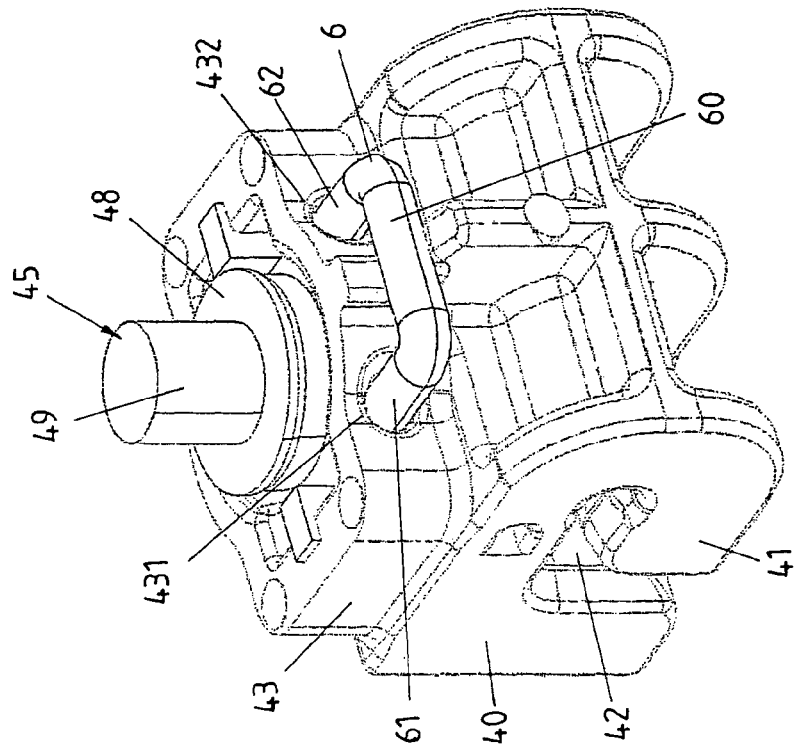

When during insertion into the bearing region 43 the bearing element 45 finally hits the base 166 of the locking element 165 with its bearing head 46 or its flattened top surface 46a, the same initially is entrained to some extent during the further insertion movement E, until it finally, as shown in FIG. 13B, has taken its proper position in the bearing region 43, which is shown in FIGS. 14A and 14B. The legs 61, 62 of the securing element 6 in turn snap into the cutout 47 of the bearing element 45 and in doing so come to lie beside the regions of the locking legs 167, 168 of the locking element 165 not provided with a recess, whereby the securing element 6 or its legs 61, 62 are positively held in the respective cutout 47, so that the bearing element 45 does not get out of the bearing region 43 even under the influence of great pull-off forces, as long as it is blocked by the contact surfaces 167b, 168b of the locking legs 167, 168.

FIGS. 15A to 15C show a modification of the exemplary embodiment of FIGS. 5A to 5C, which is based on the use of a securing element 8 without additional locking element, but where the securing element 8, which has a drawer-like structure with a base 80 and two legs 81, 82 protruding therefrom, already can be inserted into the bearing region 43 in a drawer-like manner, before the bearing element 45 is introduced. It is held there by a holder 85, e.g. in the form of a snap-in hook.

In the region of its legs 81, 82 and possibly also in the region of its base 80, the securing element 8 includes elastic tongues 83, 84 obliquely protruding to the inside, which during insertion of the bearing element 45 into the bearing region 43 are spread off by its bearing head 46 and subsequently snap into its cutout 47 and engage behind the same, wherein the elastic tongues 83, 84 obliquely press against the wall of the cutout 47 such that its holding effect still is amplified when pull-off forces act on the bearing element 45, which have the tendency to lift the same out of the bearing region.

FIGS. 16A to 16C show an arrangement according to FIGS. 15A to 15B with a modified, two-part securing element 108, which consists of two substantially semicircular securing portions 181, 182 arranged opposite each other, which each include elastic tongues 183, 184 protruding to the inside. The securing element 108 is integrated into the bearing region 43 with its two securing portions 181, 182, as shown in FIGS. 16A and 16B.

During insertion of the bearing element 45 into the bearing region 43, the securing element 108 with its elastic tongues 183, 184 acts in a way corresponding to the securing element 8 of FIGS. 15A, 15B with the tongues 83, 84 shown there.

As material for the securing elements 8, 108 of FIGS. 15A to 15C and 16A to 16C plastic material and metal can be used, for example, wherein for the securing element 8 of FIG. 15C in particular plastic material is advantageous and for the securing element 108 of FIG. 16C in particular metal. The latter can be injected during the manufacture of the guiding element/slider which defines the bearing region 43.

FIGS. 17A to 17C show a modification of the arrangement of FIGS. 5A to 5C, according to which the securing element 106 only is pushed into the bearing region 43 after the bearing element 45 already has been inserted there.

The securing element 160 is formed U-shaped (and therefore drawer-like) and comprises a base 160 with legs 161, 162 protruding therefrom, wherein both from the base 160 and from the legs 161, 162 securing regions 163, 164, 165 protrude to the inside, which engage into the cutout 47 of the bearing element 45, cf. FIGS. 17A and 17B, when the securing element 106 is pushed into the bearing region 43 after insertion of the bearing element 45. By means of an angled portion 168 the securing element 106 rests against the outer wall of the bearing region 43, when it has properly been inserted laterally such that its securing portions 163 to 165 engage into the cutout 47 of the bearing element 45.

In the exemplary embodiment of FIGS. 18A to 21B several resilient latching hooks or latching tongues 91 to 94 are integrally molded to the bearing region 43 as securing element 9, which according to FIGS. 18A, 18B and 19A, 19B can be spread apart by the bearing head 46 during insertion of the bearing element 45 into the bearing region 43, and which according to FIGS. 20A to 21B subsequently snap into the cutout 47 of the bearing element 45 and positively engage in the same.

To this securing element 9 with elastic latching hooks or latching tongues 91 to 94 a crown is associated as secondary securing element or locking element 95, which according to FIG. 18C is designed ring-shaped and which according to FIGS. 18A, 18B, 19A is arranged at the bearing region 43 such that it encloses the latching hooks or tongues of the securing element 9.

On its inside, the locking element 95 includes cutouts 96, into which the latching hooks or tongues 91 to 94 can move when they are spread apart during insertion of the bearing element 43, as can be seen in FIGS. 18A, 18B and 19A, wherein FIG. 19B is an additional exploded representation for illustration of the details.

Figure 20B:
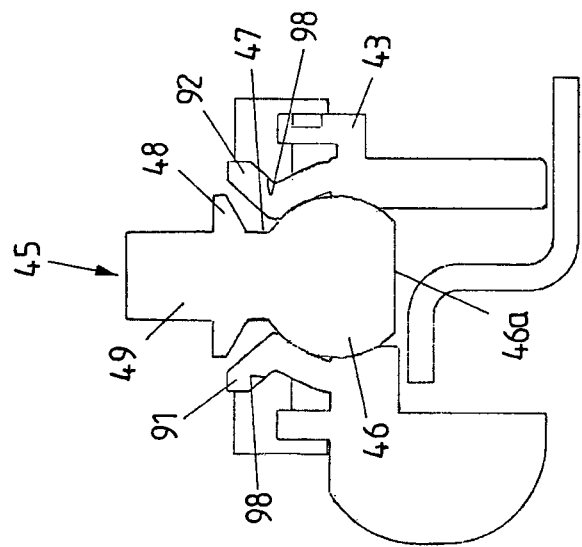
FIG. 20B shows a cross-section of the arrangement of FIG. 20A.
Figure 20A:
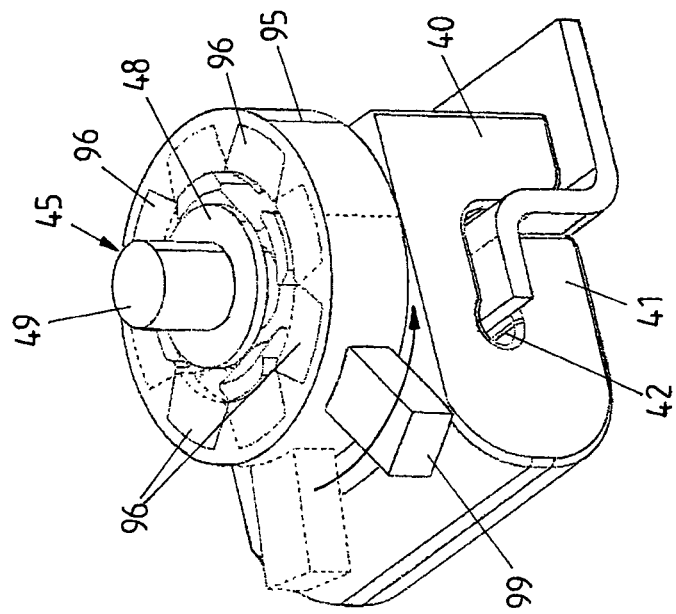
FIG. 20A shows a perspective representation of the arrangement of FIGS. 18A and 18B with fully inserted bearing element and a locking element which is positioned for locking the securing element, so that the latter holds the bearing element.

When after the complete insertion of the bearing element 45 into the bearing region 43 the latching hooks or tongues of the securing element 9 engage into the cutout 47 of the bearing element 45, the (ring-shaped) locking element 95 is rotated (by means of an actuating portion 99), e.g. by 45°, so that now no longer the cutouts 96, but rather blocking portions 98 are located opposite the latching hooks or tongues 91 to 94. The same thereby are firmly held in the position in which they engage into the cutout 47 of the bearing element 45, as is shown in FIGS. 20A, 20B and 21A and is illustrated in addition with reference to the exploded representation according to FIG. 21B.

Figure 21B:
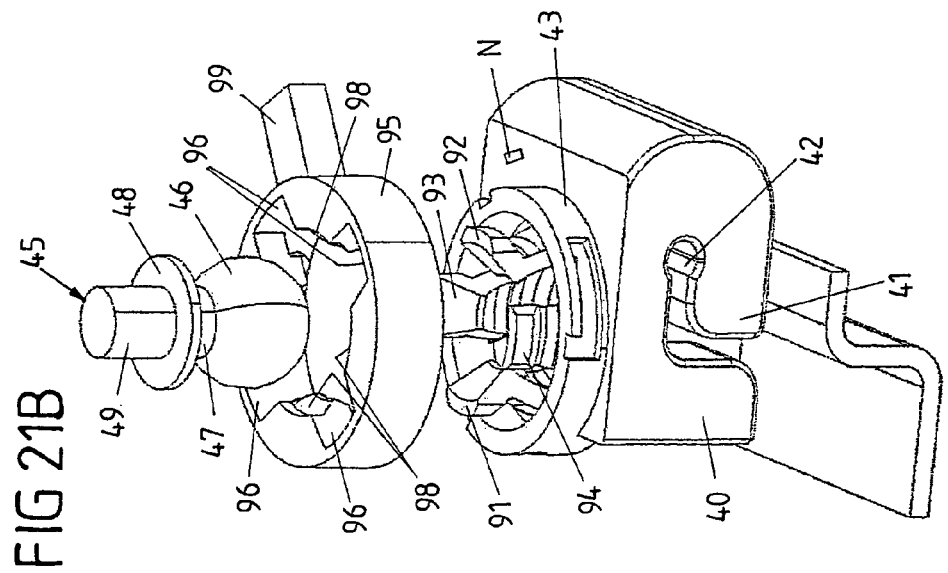
FIG. 21B shows a detail representation of the arrangement of FIG. 20A.
Figure 21A:
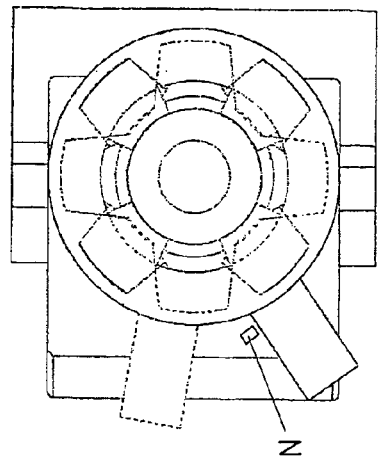
FIG. 21A shows a top view of the arrangement of FIG. 20A.

In FIGS. 21A and 21B a latching nose N furthermore is schematically indicated, which can serve to hold the crown-shaped locking element 95 in its locked position and which for this purpose for example can cooperate with the actuating element 99 of the locking element 95. The latching nose N can be designed elastic, so that it can be crossed over by applying a sufficient force, in order to be able to again transfer the locking element 99 into its unlocked position. Furthermore, the latching nose N can include an inclined surface, e.g. in the form of a ramp, in order to facilitate the cross-over by applying a force.

The invention claimed is:

1. A path-controlled adjustment device for a window pane of a motor vehicle comprising;
    a carrier assembly;
    at least two guideways provided at the carrier assembly which define an adjustment path for an adjustable window pane and which are spaced from each other transversely to the adjustment path; and
    a driver which includes a connector connecting the driver to the window pane and which is in engagement with the at least two guideways so as to be longitudinally movable, wherein
        the carrier assembly comprises a first carrier element and a second carrier element which are connected with each other at a plurality of fixing points,
        on the first carrier element, fixing points, by means of which the first carrier element is fixed at the second carrier element, are connected with each other by reinforcement paths,
        the first carrier element is formed as a guide plate on which at least two guideways are provided,
        the second carrier element is formed as a module carrier by means of which the carrier assembly is to be mounted in a motor vehicle door such that the module carrier covers a cutout of a door structure of the motor vehicle door,
        the first carrier element is made of a more rigid material than the second carrier element, and
        the second carrier element includes at least one guideway.

2. The adjustment device according to claim 1, wherein the reinforcement paths are formed by longitudinally extending formations of the first carrier element.

3. The adjustment device according to claim 1, wherein the reinforcement paths are formed by longitudinal, continuous profilings between the fixing points.

4. The adjustment device according to claim 1, wherein the reinforcement paths are formed by material deepenings or material bulges at the first carrier element.

5. The adjustment device according to claim 1, wherein the reinforcement paths each connect fixing points that the reinforcement paths merge into an associated fixing point or adjoin an associated fixing point.

6. The adjustment device according to claim 1, wherein all fixing points which serve a fixation of the first carrier element at the second carrier element are connected with each other by means of reinforcement paths.

7. The adjustment device according to claim 1, wherein the fixing points each comprise a mounting opening.

8. The adjustment device according to claim 7, wherein a material formation surrounds the mounting opening of the fixing point.

9. The adjustment device according to claim 1, wherein the fixing points each comprise a material formation.

10. The adjustment device according to claim 9, wherein the material formation of the fixing point is formed by a material deepening.

11. The adjustment device according to claim 1, wherein the fixing points at the first carrier element are spaced from each other along an adjustment direction of the driver.

12. The adjustment device according to claim 1, wherein the fixing points at the carrier element alternately are arranged adjacent to a first guideway and to a second guideway.

13. The adjustment device according to claim 1, wherein by means of guiding elements the driver is in engagement with the guideways so as to be longitudinally movable.

14. The adjustment device according to claim 13, wherein for a tolerance compensation at least one of the guiding elements is pivotally connected with the driver.

15. The adjustment device according to claim 1, wherein the reinforcement paths are formed by material deepenings and material bulges at the first carrier element.

* * * * *